US011538045B2

(12) United States Patent
Newell et al.

(10) Patent No.: US 11,538,045 B2
(45) Date of Patent: Dec. 27, 2022

(54) APPARATUS, SYSTEMS AND METHODS FOR DETERMINING A COMMENTARY RATING

(71) Applicant: DISH Network L.L.C., Englewood, CO (US)

(72) Inventors: Nicholas Newell, Centennial, CO (US); Rob Johannes Clerx, Boulder, CO (US)

(73) Assignee: DISH Network L.L.C., Englewood, CO (US)

(*) Notice: Subject to any disclaimer, the term of this patent is extended or adjusted under 35 U.S.C. 154(b) by 851 days.

(21) Appl. No.: 16/146,531

(22) Filed: Sep. 28, 2018

(65) Prior Publication Data

US 2020/0104860 A1 Apr. 2, 2020

(51) Int. Cl.
G06Q 30/02 (2012.01)
G10L 17/26 (2013.01)
G06F 3/00 (2006.01)
G10L 15/22 (2006.01)
G06F 16/9032 (2019.01)
G06F 16/903 (2019.01)
(Continued)

(52) U.S. Cl.
CPC ......... G06Q 30/0201 (2013.01); G06F 3/005 (2013.01); G06F 16/90332 (2019.01); G06F 16/90335 (2019.01); G06V 20/39 (2022.01); G06V 40/176 (2022.01); G06V 40/20 (2022.01); G10L 15/22 (2013.01); G10L 17/26 (2013.01); G06F 2203/011 (2013.01); G10L 2015/227 (2013.01)

(58) Field of Classification Search
CPC ......... G06F 16/90335; G06F 16/90332; G06F 3/005; G06F 2203/011; G06Q 30/0201; G06K 9/00315; G06K 9/00335; G06K 9/00704; G10L 15/22; G10L 17/26; G10L 2015/227
USPC ....................................................... 707/749
See application file for complete search history.

(56) References Cited

U.S. PATENT DOCUMENTS 5,893,902 A 4/1999 Transue et al.
6,229,533 B1 5/2001 Farmer et al.
(Continued)

Primary Examiner — Tony Mahmoudi
Assistant Examiner — Kamal K Dewan
(74) Attorney, Agent, or Firm — Perkins Coie LLP

(57) ABSTRACT

Commentary rating determination systems and methods determine a commentary rating for commentary about a subject media content event that has been generated by a community member. An exemplary embodiment receives video information acquired by a 360° video camera, identifies a physical object from the received video information, determines a physical attribute associated with the identified physical object, wherein the determined physical attribute describes a characteristic of the identified physical object, compares the determined physical attribute of the identified physical object with a plurality of predefined physical object attributes stored in a database, and in response to identifying one of the plurality of predefined physical object attributes that matches the determined physical attribute, associates the quality value of the identified one of the plurality of predefined physical object attributes with the identified physical object. Then, the commentary rating is determined for the commentary based on the associated quality value.

20 Claims, 2 Drawing Sheets

(51) Int. Cl.
   *G06V 20/00*     (2022.01)
   *G06V 40/20*     (2022.01)
   *G06V 40/16*     (2022.01)

(56) References Cited

U.S. PATENT DOCUMENTS

| | | |
|---|---|---|
| 6,476,830 B1 | 11/2002 | Farmer et al. |
| 7,086,005 B1 | 8/2006 | Matsuda |
| 8,233,005 B2 | 7/2012 | Finn et al. |
| RE44,054 E | 3/2013 | Kim |
| 8,627,215 B2 | 1/2014 | Blattner et al. |
| 8,753,185 B1 * | 6/2014 | Klappert ............... A63F 13/10 463/9 |
| 9,020,956 B1 * | 4/2015 | Barr .................. G06F 16/951 707/748 |
| 9,129,026 B1 | 9/2015 | Hyatt et al. |
| 9,210,313 B1 | 12/2015 | Svendsen |
| 9,306,989 B1 | 4/2016 | Jayaram |
| 9,467,718 B1 | 10/2016 | Newell et al. |
| 9,607,419 B2 | 3/2017 | Kim et al. |
| 9,851,561 B2 | 12/2017 | Lu |
| 10,158,917 B1 | 12/2018 | Logan et al. |
| 10,270,983 B1 | 4/2019 | Van Os et al. |
| 2001/0019330 A1 | 9/2001 | Bickmore et al. |
| 2001/0042098 A1 | 11/2001 | Gupta et al. |
| 2002/0113791 A1 | 8/2002 | Li et al. |
| 2002/0147991 A1 * | 10/2002 | Furlan ................ H04N 7/122 725/135 |
| 2005/0081159 A1 | 4/2005 | Gupta et al. |
| 2007/0162863 A1 | 7/2007 | Buhrke et al. |
| 2007/0168863 A1 | 7/2007 | Blattner et al. |
| 2007/0271331 A1 | 11/2007 | Muth |
| 2007/0271338 A1 | 11/2007 | Anschutz |
| 2008/0030429 A1 | 2/2008 | Hailpern et al. |
| 2008/0215975 A1 | 9/2008 | Harrison et al. |
| 2009/0144272 A1 * | 6/2009 | Adarsh ............ G06F 16/90335 |
| 2009/0198675 A1 | 8/2009 | Mihalik et al. |
| 2010/0050088 A1 | 2/2010 | Neustaedter et al. |
| 2010/0077315 A1 | 3/2010 | Fujioka |
| 2010/0115426 A1 | 5/2010 | Liu et al. |
| 2010/0162136 A1 | 6/2010 | Hamilton, II et al. |
| 2010/0185510 A1 | 7/2010 | Maier et al. |
| 2010/0188929 A1 | 7/2010 | Kitaura |
| 2010/0205541 A1 | 8/2010 | Rapaport et al. |
| 2010/0220097 A1 | 9/2010 | Hamilton, II et al. |
| 2011/0225498 A1 | 9/2011 | Goldman et al. |
| 2011/0252344 A1 | 10/2011 | van Os |
| 2011/0304632 A1 | 12/2011 | Evertt et al. |
| 2012/0116804 A1 | 5/2012 | Mesika et al. |
| 2012/0158753 A1 | 6/2012 | He et al. |
| 2012/0253492 A1 | 10/2012 | Andrews |
| 2013/0013089 A1 | 1/2013 | Kawakami et al. |
| 2013/0050258 A1 | 2/2013 | Liu et al. |
| 2013/0051548 A1 | 2/2013 | Chavez |
| 2013/0086185 A1 | 4/2013 | Desmarais et al. |
| 2013/0097176 A1 * | 4/2013 | Khader ............... G06Q 30/0251 707/748 |
| 2013/0173268 A1 | 7/2013 | Weng |
| 2013/0173531 A1 * | 7/2013 | Rinearson ............ G06F 16/80 707/608 |
| 2013/0278631 A1 | 10/2013 | Border et al. |
| 2013/0282446 A1 * | 10/2013 | Dobell ............ G06Q 10/06398 705/7.42 |
| 2014/0036022 A1 | 2/2014 | Croen et al. |
| 2014/0089801 A1 | 3/2014 | Agrawal |
| 2014/0188997 A1 | 7/2014 | Schneiderman et al. |
| 2014/0201125 A1 | 7/2014 | Moeinifar et al. |
| 2014/0337267 A1 | 11/2014 | Karamchedu et al. |
| 2015/0002394 A1 | 1/2015 | Cho et al. |
| 2015/0235398 A1 | 8/2015 | Kim et al. |
| 2015/0249815 A1 | 9/2015 | Sandrew et al. |
| 2015/0264053 A1 | 9/2015 | Shuster et al. |
| 2015/0301725 A1 | 10/2015 | Madhvanath et al. |
| 2016/0364651 A1 * | 12/2016 | Flinn .................. G06Q 50/01 |
| 2017/0026669 A1 | 1/2017 | Newell et al. |
| 2017/0068430 A1 | 3/2017 | Brown et al. |
| 2017/0076485 A1 | 3/2017 | Shuster et al. |
| 2017/0139920 A1 | 5/2017 | Ball |
| 2017/0344809 A1 * | 11/2017 | Twyman ............. H04N 21/4668 |
| 2018/0077440 A1 * | 3/2018 | Wadhera .......... H04N 21/26283 |
| 2018/0181367 A1 | 6/2018 | Goi |
| 2018/0189691 A1 * | 7/2018 | Oehrle ................ G06Q 10/063 |
| 2018/0190010 A1 | 7/2018 | Sawaki et al. |
| 2018/0262717 A1 | 9/2018 | Imaoka |
| 2019/0012836 A1 | 1/2019 | Lim et al. |
| 2019/0130599 A1 | 5/2019 | Gebbie et al. |
| 2019/0188895 A1 | 6/2019 | Miller, IV et al. |
| 2019/0206128 A1 | 7/2019 | Logan et al. |
| 2019/0261125 A1 | 8/2019 | Lyren et al. |
| 2019/0265945 A1 | 8/2019 | Newell et al. |
| 2019/0278295 A1 | 9/2019 | Matsuno et al. |
| 2019/0379877 A1 * | 12/2019 | Oh ...................... H04N 13/194 |
| 2020/0265070 A1 | 8/2020 | Rapaport et al. |
| 2021/0165837 A1 * | 6/2021 | Rinearson .............. G06Q 30/02 |
| 2021/0204023 A1 * | 7/2021 | Knox ............... H04N 21/44218 |

\* cited by examiner

APPARATUS, SYSTEMS AND METHODS FOR DETERMINING A COMMENTARY RATING

BACKGROUND

Thematic content, interchangeably referred to herein as a media content event, presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically.

Thematic content is readily available for presentation to the user (i.e., viewing and listening to by the user) at a user's home. Thematic content may even be presentable to a user on their mobile devices. Such thematic content, if in the form of a feature movie or film, may also be available at a public location, such as a movie theatre or the like. Other public places, such as bars, restaurants, office lobbies, libraries, or the like, may include televisions or other presentation devices for viewing thematic content by their patrons.

In some situations, a group of friends may go to a public theatre, a residence, a bar, or the like to view a feature film or other thematic content. Afterwards, the group may go to a coffee shop or other location wherein a lively and interesting conversation about the recently viewed thematic content ensues. Many individuals find such group conversations about the thematic content enjoyable and highly desirable.

In other situations, thematic content may be presented to the user when the user is alone or with a limited number of other individuals. In such situations, it may be difficult for the user to have a lively and interesting conversation about the presented thematic content with a group of other individuals because the other individuals may have not yet seen the thematic content, the other users may have previously seen the thematic content a relatively long time ago (and have therefore forgotten the thematic content at least to some extent), or the other users may simply not be available to carry on a conversation about the thematic content.

With the advent of the Internet and other communication media, a variety of social networking systems have been devised wherein individuals who are members of the social community may input their commentary about a particular thematic content event that they have seen. Other community members may access such social media facilitated commentary. Accordingly, the community member who is viewing such commentary may read and/or listen to the one-sided commentary provided by other community members. However, the community member viewing such commentary is not going to have an experience that is comparable to the above-described group of friends who are together to discuss a particular thematic content event.

Further, the commentary about a particular media content event (interchangeably referred to herein as the "subject media content event") is obtained by capturing a video of the community member and recording their spoken commentary while they are discussing the media content event that they have viewed (interchangeably referred to herein as "consumed"). The video of the speaking community member is typically acquired using an image capture device, such as a video camera. Video cameras may be stand alone devices, or may be incorporated into other devices such as cellular phones, smart phones, personal computers, lap tops, persona device assistants (PDAs), smart watches, or the like.

However, these video camera devices have a limited field of view such that a video of the speaking community member and a limited region around the periphery of the community member are acquired by the video camera. Other regions, such as behind the video camera, are not included in the captured video of the speaking community member.

In a large social community environment, there is likely to be many, even thousands of, individual community member commentaries that a particular community member may choose to view. The social community platform may be configured to make recommendations to the viewing community member based on the determined quality and/or relevance of a community member's commentary. For example, higher quality community member commentaries may receive a higher recommendation over lower quality community member commentaries. Alternatively, or additionally, more relevant community member commentaries (such as from personal friends or relatives of the viewing community member) may receive a higher recommendation over lower relevance community member commentaries.

Accordingly, there is a need in the arts to improve the ability to process a community member's commentary about a subject media content event to facilitate the ability of other members of the social community to choose to select and to view a particular community member's commentary when there are many, even thousands of, different community member commentaries to choose from.

SUMMARY

Systems and methods of determining commentary ratings for commentary about a subject media content event that has been generated by a community member are disclosed. An exemplary embodiment receives video information acquired by a 360° video camera, identifies a physical object from the received video information, determines a physical attribute associated with the identified physical object, wherein the determined physical attribute describes a characteristic of the identified physical object, compares the determined physical attribute of the identified physical object with a plurality of predefined physical object attributes stored in a database, and in response to identifying one of the plurality of predefined physical object attributes that matches the determined physical attribute, associates the quality value of the identified one of the plurality of predefined physical object attributes with the identified physical object. Then, the commentary rating is determined for the commentary based on the associated quality value.

BRIEF DESCRIPTION OF THE DRAWINGS

Preferred and alternative embodiments are described in detail below with reference to the following drawings.

DETAILED DESCRIPTION

Figure 1:
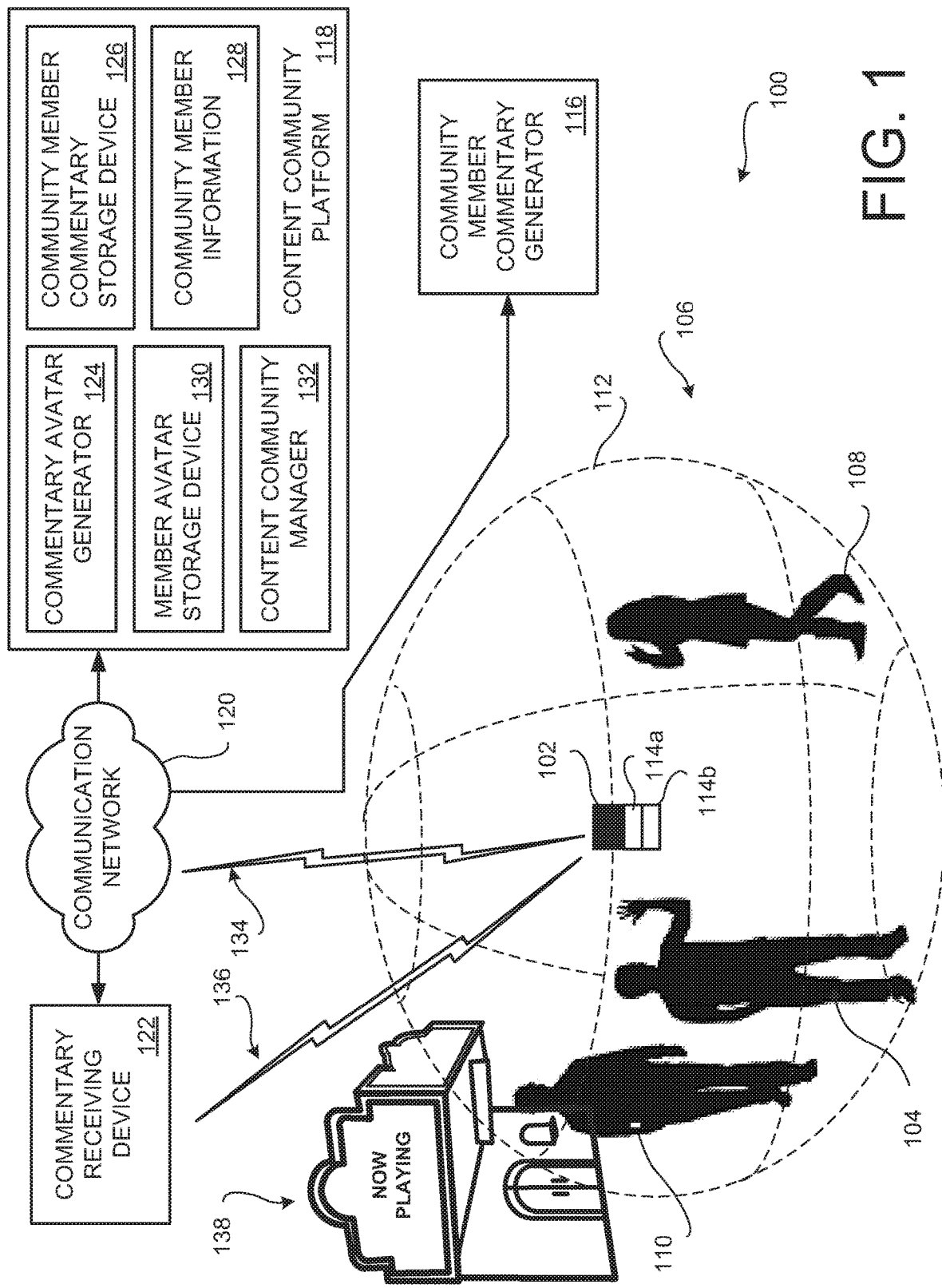
FIG. 1 is a block diagram of an embodiment of a community member commentary acquisition system 100.

FIG. 1 is a block diagram of an embodiment of a community member commentary acquisition system 100. Embodiments of the community member commentary acquisition system 100 acquire video information (image information and/or audio information) using a 360 degree (360°) video camera 102. The 360° video camera 102 captures (acquires) a video image of the speaking community member 104 who is providing their commentary about a subject media content event. Because the 360° video camera 102 has a 360° field of view, the acquired video information includes image information around the community member 104 while they are making their commentary pertaining to the subject media content event.

The commentary of the community member 104 is an expression of the opinions and viewpoints of the community member 104 pertaining to some topic or subject of interest. The commentary may be expressed as verbal commentary (interchangeably referred to herein as a verbal response) that is spoken by the community member 104. Alternatively, or additionally, the opinions and viewpoints of the community member 104 may be expressed as non-verbal actions made by the community member 104. Non-limiting examples of non-verbal actions expressed by the community member 104 may include facial expressions (a facial expression attribute such as a "smile" that expresses satisfaction or happiness, a "frown" that expresses dissatisfaction or disappointment, a "raised eyebrow" that expresses a question or confusion, etc.) and/or a bodily gesture (a gesture attribute such as "hand waving" that expresses excitement, a "nodding" of their head that expresses consent or agreement, "clapping" that expresses satisfaction or appreciation, etc.). Here, the identified facial expression attribute and/or the identified gesture attribute, described using a word or phrase that describes the facial expression and/or the identified gesture, are compared with a plurality of predefined facial expression attributes and/or gesture attributes (defined using a textual word or phrase) stored in a database of predefined attributes. The quality value and/or relevance value associated of a predefined facial expression attribute and/or gesture attribute that matches or corresponds to an identified facial expression attribute and/or gesture attribute can then be associated with the community member's commentary for determination of the commentary rating.

Additionally, or alternatively, the facial expression may be used to determine the truthfulness of the community member 104 during the generation of the commentary. In response to determining that the person is not speaking truthfully, a relatively lower quality value may be associated with the commentary. In contrast, in response to determining that the person is speaking truthfully, a relatively higher quality value may be associated with the commentary.

The 360° video camera 102 acquires video information and optionally audio information, wherein the video information substantially spans a 360° field of view about a community member who is generating commentary about the subject media content event. In the various embodiments of the community member commentary acquisition system 100, the 360° field of view image information is analyzed to identify one or more physical objects in the environment 106 that are in the vicinity of the community member 104 and that are viewable in the image information acquired by the 360° video camera 102 while the community member 104 is speaking their commentary about the subject media content event. That is, one or more physical objects are identified by the various embodiments of the community member commentary acquisition system 100 that are visible and identifiable in the image information captured (acquired) by 360° field of view of the 360° video camera 102. Based on the identification of the one or more physical objects that are included in the image information acquired by the 360° video camera 102 that are viewable in the environment 106, embodiments of the community member commentary acquisition system 100 determine the quality and/or relevance of the community member's commentary. Here, one or more of the identified physical objects are used to adjust (increase or decrease) a commentary rating associated with the community member's commentary. The commentary rating is based on a quality value and/or a relevance value that has been associated with the community member's commentary.

The commentary ratings are used to identify particular commentaries that are to be provided to a requesting community member who wishes to view commentary about the same subject media content event. Embodiments may identify a number of commentaries made by other community members that may be of interest to the requesting community member. The commentary ratings enable selection of commentaries that are of a higher quality (than non-selected commentaries) and that are of a higher relevance to that particular requesting community member.

The phrase "quality value" is defined herein is a numerical value that corresponds to the quality of the commentary relative to the subject media content event of interest. The quality value as applied to commentary is an indicator of the degree to which a viewer (consumer) of the commentary, here the requesting community member, is likely to be satisfied by the commentary about the subject media content event. That is, if the viewer is likely to be satisfied, then the quality value of the commentary may be higher than a quality value associated with commentary when the viewer is more likely to be disappointed in the commentary. Since the quality value relates to satisfaction, the quality value determined for a particular community member's commentary will be the same regardless or the particular community member who is viewing that particular commentary.

For example, if the viewer is satisfied with the commentary, such as when the commentary provides a thoughtful and thorough analysis of the subject media content event, the assigned quality value may be relatively high. That is, does the commentary satisfy the viewer's needs and wants regarding their interest in learning more about the subject media content event? If yes, then the assigned quality value may be relatively high. On the other hand, if the view is not satisfied after consuming the commentary, the assigned quality value may be relatively low.

As another illustrative non-limiting example, if the viewer is more informed after viewing the commentary, the assigned quality value may be relatively high. In contrast, if the viewer in not informed after viewing the commentary, the assigned quality value may be relatively low.

The quality of a community member's commentary about a subject media content event may vary based upon a variety of factors. For example, the quality of the community member's commentary may be higher if the commentary is made immediately after or shortly after the community member views the subject media content event since the storyline, particular scenes, or actor performances will be fresh in the mind of the community member. In contrast, if the community member's commentary is captured a long time after the community member has viewed the subject media content event, the quality of their commentary may be lower since they may have forgotten about portions or the subject media content event.

Additionally, or alternatively, a "relevance value" may be associated with a particular commentary generated by a community member 104. The phrase "relevance value" is defined herein is a value that indicates the relevance of the content of the commentary relative with respect to the subject media content event and to a viewpoint of a viewer who consumes the commentary. The relevance value as applied to commentary is an indicator of the degree to which subject matter of the commentary is relevant both to the subject media content event and to the viewing community member. That is, is the content of the commentary relevant to the subject media content event? For example, the community member 104 may spend the entirety of their commentary talking about the subject media content event, and describe various scenes, actor performance, story line elements or the like of the subject media content event. Here, the assigned relevance value may be relatively high. On the other hand, the substance of the commentary may be only indirectly related to aspects of the subject media content event, and therefore the assigned relevance value may be relatively low.

Additionally, or alternatively, the relevance value may be based in part upon an interpersonal relationship between the viewer consuming the commentary and the community member 104 who generated the commentary. Here, the relevance value is associated with a degree of interpersonal relationship between the viewer and the community member 104 who is generating the commentary. For example, if the viewer and the community member 104 are close personal friends, the assigned relevance value may be relatively high because the viewer will likely perceive that commentary as being more relevant because of their interpersonal relationship. That is, a person generally give more weight to another person's viewpoint if that person is a friend, relative, or the like that is well known to the person. In contrast, if the community member 104 who generated the commentary is unknown to, or is even disliked by, the viewer, the assigned relevance value may be relatively low since the viewer may not perceive that the commentary as being relevant since there is no interpersonal relationship between the viewer and the community member 104 who generated the commentary.

Since the relevance value relates to how a particular reviewing community member is likely to personally want to view a particular community member's commentary, the quality value determined for a particular community member's commentary based on an interpersonal relationship, the relevance value is very likely to be different from one viewing community member to another. Accordingly, the relevance value is determined for a particular community member who is viewing that particular commentary.

Any suitable range of quality values and/or relevance values may be used by the various embodiments to define a particular commentary rating that is associated with the commentary provided by a particular community member 104. For example, a quality value may be assigned a value between 1 and 10, wherein a value of 10 is the highest quality value (or vice versa). In the various embodiments, any suitable quality value determination algorithm and/or relevance value determination algorithm now known or later developed may be used by the various embodiments of the community member commentary acquisition system 100.

In practice, the 360° video camera 102 acquires video and/or audio information of the community member 104 who is making their commentary about the subject media content event and the surrounding environment 106. The video and/or audio information that includes the expressed commentary of the community member 104 and the surrounding environment 106 acquired by the 360° video camera 102 is then communicated to embodiments of the community member commentary acquisition system 100. This information may be communicated after the completion of the community member's commentary, may be communicated during capture of the community member's commentary, or at any other suitable time.

Over time, commentary generated by many hundreds of different community members, or even thousands of community members, can be acquired for a particular media content event (interchangeably referred to herein as the subject media content event). When a community member is interested in learning about a particular media content event, the community member submits a request for commentary pertaining to the subject media content event to the community member commentary acquisition system 100. The commentary request specifies the subject media content event. Embodiments of the community member commentary acquisition system 100 then select a plurality of commentaries that are then presented to the requesting community member. The commentaries are preferably presented visually and audibly as an animated avatar to the requesting community member (interchangeably referred to herein as a "viewer") who is viewing a display device or system. Accordingly, the viewer is able to view a graphical avatar that is generated based on the commentary made by the community member 104. In some situations, the presented avatar may be a video image of the community member 104 making their commentary such that the viewer has the sensation of being present with the community member 104 while they are making their commentary. The animation may be based on captured image information and/or may be based on synthesized information that may resemble all of, or part of, the community member 104 or another character.

One challenge solved by embodiments of the community member commentary acquisition system 100 is the selection of particular commentaries from hundreds or even thousands of commentaries that are to be presented to a particular requesting community member. One skilled in the art appreciates that only a limited number of commentaries can be practically presented on a display to a viewer in response to receiving a commentary request. The various embodiments select particular commentaries for presentation to a requesting viewer based on the commentary rating that is determined for each of the commentaries that have been generated by the community members 104.

When a requesting community member submits a request for commentaries about a particular subject media content event, embodiments may identify a number of commentaries that have the highest, or at least very high, commentary ratings that have been defined with respect to that particular requesting community member. The identified commentaries may then be presented to the requesting community member.

To conceptually illustrate operation of the 360° video camera 102 acquiring the commentary of the community member 104, FIG. 1 conceptually illustrates a first person 108 that is in front of the community member 104 and the 360° video camera 102. Because the 360° video camera 102 has a 360° field of view, images of the first person 108 will be acquired while the commentary of the community member 104 is acquired. A second person 110 is conceptually illustrated as walking behind the community member 104 while they are making their commentary about the subject media content event. Here, the first person 108 and the second person 110 are understood to be physical objects that are in the environment 106, and are therefore within the 360° field of view of the 360° video camera 102.

To facilitate a description of embodiments of the community member commentary acquisition system 100, a spherical space around the 360° video camera 102 is conceptually represented by the spherical surface 112. The spherical surface 112 is conceptually illustrated as being at some range (a distance attribute defined by a distance value expressed textually using a suitable measure of units) out from the 360° video camera 102 and/or out from the community member 104.

In some embodiments, suitable image processing techniques may be employed to determine and/or estimate the ranges of the first person 108 and the second person 110, and any other identifiable physical objects of interest, out from the 360° video camera 102. The determined range information may be used by some embodiments to determine whether the speaking community member 104 is engaged with either of the first person 108 and the second person 110, or is engaged with other individuals (not shown in FIG. 1) that are within the 360° field of view of the 360° video camera 102. This determined range information may then be used to determine the quality value and/or the relevance value associated with the community member's commentary.

For example, if the community member 104 is discussing the subject media content event with the first person 108 (which would be apparent from the analyzed image information of the first person 108 who is in very close proximity to the community member 104 as determined from range information), then the quality value (and/or optionally the relevance value) associated with the community member's commentary may have a higher value as compared to the situations where the community member 104 was not sharing their commentary with the first person 108 (which would be apparent from the analyzed image information if the first person 108 was determined to be relatively far away from the community member 104 based on the determined range information). That is, the determined quality value (and/or optionally the relevance value) associated with the community member's commentary may be higher when the community member 104 is actively engaged with sharing their opinion about the subject media content event with other people since an assumption can be made that the speaking community member 104 is being more genuine and/or honest because they are actively engaged with other people while expressing their opinion about the subject media content event. The determined range information, and/or other determined information, may be used to infer that the community member 104 is actively engaged in a conversation with a person(s) that that are in close proximity to. In practice, a distance from the community member 104 and/or the 360° video camera 102 to the identified physical object is determined. Then, the distance is compared with a plurality of predefined distances stored in the database and one of the plurality of predefined distances is identified that matches the distance. The quality value of the identified predefined distance is then associated with the identified person.

In contrast, in situations where the community member 104 was expressing their commentary alone to the 360° video camera 102, their expressed thoughts and/or viewpoints may be inferred to be less genuine and/or honest because their thoughts and/or viewpoints may be thought through beforehand by the community member 104 prior to capture by the 360° video camera 102 (which acquires image and audio information).

To determine the quality value and/or relevance value for any identified physical object or identified sound acquired by the 360° video camera 102, at least one attribute that is associated with the identified physical object or identified sound is determined. An attribute is defined herein as a word or phrase (preferably defined in alphanumeric text) that describes at least one characteristic about a particular identified physical object or identified sound. An identified physical object or identified sound may have one determined attribute, or may have a plurality of different attributes. The determined attribute(s) of the identified physical object or identified sound can then be compared with predefined physical attributes or sound attributes, respectively, stored in a database. The database attributes are associated with a quality value and/or a relevance value. When the attribute(s) of an identified physical object or identified sound match with or correspond to a predefined database attribute(s), the quality value and/or relevance value may be retrieved from the database and associated with the identified physical object or identified sound. When a plurality of identified physical objects or identified sounds have been identified in the video and audio information acquired by the 360° video camera 102 during the generation of the community member's commentary, the quality values and/or relevance values of the individual identified physical objects or identified sounds can be processed to determine a commentary rating for that community member's commentary.

To illustrate the use of attributes associated with an identified physical object, a first attribute of an identified physical object may be a determined range of the identified physical object from the 360° video camera 102. For example, a determined range from the first person 108 and the second person 110 to the 360° video camera 102 may be determined while the community member 104 was presenting their thoughts and/or viewpoints about a subject media content event. Any suitable range (distance) determination system now known or later developed may be used by the various embodiments of the community member commentary acquisition system 100. An attribute data base may have a plurality of ranges, each with an associated quality value and/or relevance value. The match between the determined range of the identified physical object and the database range will enable embodiments to associated the quality value and/or relevance value of the database range with the identified physical object.

Additional attributes about the identified physical objects may be used when the quality and/or relevance of the community member's commentary is determined. For example, the identity of the first person 108 and/or the second person 110 may be determinable from the acquired video information. Based on the determined identity (an attribute expressed as a word or phrase) of the first person 108 and/or the second person 110, an interpersonal relationship (an attribute expressed as a word or phrase, such as "close friend, best friend, enemy, brother, sister, cousin, parent, etc.) between the speaking community member 104 and the identified first person 108 and/or the second person 110 may be determined. This quality attribute and/or relevance attribute associated with the database interpersonal relationship attribute (which has been determined by matches of the speaking community member 104 and the identified first person 108 and/or the second person 110) may be used to determine the quality and/or relevance of the community member's commentary.

An example embodiment may identify of the first person 108 and/or the second person 110 using a suitable facial recognition algorithm that analyzes the acquired image information. The suitable facial recognition algorithm would identify a person in the field of view of the 360° video camera 102 by analyzing the acquired video information. Then, once a physical person in the acquired image information is identified, the face area of the person can be determined. Then, facial characteristics may be determined from the acquired video information. The determined facial characteristics may be compared with facial characteristics of known people such that a match between the facial characteristics of a known person and the determined facial characteristics identified in the acquired video information. In a preferred example embodiment that employs this optional feature, images and/or facial characteristics of individuals who have an interpersonal relationship with the community member 104 are stored in a suitable memory medium such that a more efficient and faster analysis of facial characteristics can be performed by embodiments of the community member commentary acquisition system 100. For example, analyzing the facial characteristics of a limited number of individuals who have an interpersonal relationship with the community member 104 (even if there are hundreds or even thousands of individuals) could be completed in a relatively shorter period of time and more efficiently than analyzing facial characteristic of the entirety of the general population of community members or of other people who are not community members.

On the other hand, identifying the person from the general population may be later used to determine the relevance value for the commentary. When a requesting community member requests commentary for a particular subject media content event, an interpersonal relationship may exist between any identified people and the requesting community member. Since the request includes identification information that can be used to identify the requesting community member, and since interpersonal relationship information between the requesting community member and the general population of community members is available, an interpersonal relationship can be identified. Here, the identities of people in the environment 106 that have been identified in the video and/or audio information acquired by the 360° video camera 102 during capture of the community member's commentary are compared with the identities of people having an interpersonal relationship with the requesting community member. If a match is found, then characteristics of the interpersonal relationship may be accessed. For example, if the identity of the first person 108 is used to determine that that person is a close friend or relative of the requesting community member, a relatively higher relevance value may be determined. If the first person 108 is unknown to the requesting community member (has not interpersonal relationship), then a relatively lower relevance value may be determined. If the first person 108 is disliked by the requesting community member, an even lower relevance value may be determined.

Alternatively, or additionally, the identity of the first person 108 and/or the second person 110 may be made by analyzing acquired audio content. For example, the of the first person 108 and/or the second person 110 may spoken by the community member 104 while they are generating their commentary. Any suitable voice recognition algorithm may be used in the various embodiments to analyze the audio information acquired by the 360° video camera 102 while the community member 104 was speaking their commentary. A natural language processing algorithm may be used to identify the words of the commentary. If a name is identified in the acquired audio information, the name may be used to identify the first person 108 and/or the second person 110. Alternatively, or additionally, the names of individuals having an interpersonal relationship with the community member 104 may be stored in a suitable memory medium. The name (expressed as a textual word or phrase) determined from the acquired audio information may be compared with names of known people such that a match between the name of a known person and the determined name identified in the acquired audio information will identify the person(s) who is shown in the acquired video information.

Alternatively, or additionally, the identity of the first person 108 and/or the second person 110 may be specified by the community member 104 as an input provided to the 360° video camera 102 and/or another electronic device. For example, the 360° video camera 102 may have a key pad, touch screen, an/or other suitable user interface device that the community member 104 may use to specify the name of the first person 108 and/or the second person 110.

Any suitable identity determination system now known or later developed may be used by the various embodiments of the community member commentary acquisition system 100 to identify people that the community member 104 is talking to while they are making their commentary about a media content even of interest. Such identity determination systems may use facial recognition to identify a person, audio analysis to identify a spoken name of a person, and/or direct user input that specifies a person's name.

To illustrate the use of this attribute (identity of an object), the first person 108 may be a close personal friend or relative of the community member 104. Here, embodiments may assign a higher quality value associated with the community member's commentary because an assumption may be made that the commentary being provided by the community member 104 is more genuine and/or honest when they are speaking to a close personal friend or relative. In contrast, if the community member 104 is speaking to someone that they do not know, then it is possible that their commentary may be less genuine and/or honest.

Additionally, or alternatively, the reactions of the first person 108 and/or the second person 110 (a reaction attribute defined by a word or phrase) while they are consuming in real time the community member's commentary may be analyzed to adjust the quality value and/or the relevance value of the community member's commentary. For example, in instances when the first person 108 is apparently agreeing with and/or enjoying listening to the community member's commentary, the first person 108 may be smiling, nodding their head, and/or performing some other gesture that can be identified in the video information acquired by the 360° video camera 102. The identified facial expression, head movement, and/or gesture may be compared with a database of known expressions, head movements, and/or gestures that are associated with favorable reactions of a person. When the identified facial expression, head movement, and/or gesture corresponds to a known expression, head movement, and/or gesture associated with favoritism, then the quality value and/or the relevance value may be relatively higher.

Further, some particular expressions, head movements, and/or gestures may be associated with a degree of favoritism. For example, vigorous head nodding may be associated with a higher degree of favoritism as compared to a slight nod of the head of the first person 108. Accordingly, vigorous head nodding may be result in a higher quality value and/or relevance value compared to the quality value and/or the relevance value determined for a slight nod.

In contrast, the reactions of the first person 108 and/or the second person 110 may indicate that they are disagreeing with and/or are disliking the community member's commentary. For example, the first person 108 may be frowning, shaking their head sideways, looking away from the community member 104, looking at other objects, and/or performing some other gesture that can be identified in the video information acquired by the 360° video camera 102. The identified facial expression, head movement, and/or gesture may be compared with the database of known expressions, head movements, and/or gestures that are associated with unfavorable reactions of a person. When the identified facial expression, head movement, and/or gesture corresponds to a known expression, head movement, and/or gesture associated with disfavor, then the quality value and/or the relevance value may be relatively lower. In an example embodiment, when the person is agreeing with the commentary, the associated quality value is greater than a quality value associated with disagreeing.

Optionally, the time of the reaction of the first person 108 and/or the second person 110 may be determined and correlated to the time of a particular comment made by the community member 104. This time attribute of the identified facial expression, head movement, and/or gesture may then be considered when determining the quality value and/or the relevance value. A natural language synthesis algorithm may be used to identify the words of the community member's commentary at a particular time. Artificial intelligence algorithms can then be used to identify a particular comment, and then identify the intended meaning of that comment. Since the 360° video camera 102 is simultaneously acquiring the community member's commentary and video information of the reaction of the first person 108 and/or the second person 110, a time stamp or other time information may be used to associate the reaction of the first person 108 and/or the second person 110 with a particular comment being made by the community member 104. That is, the determined reaction attribute corresponding to the reaction of the first person 108 and/or the second person 110 can be associated with the particular comment that was made at the time of the reaction of the first person 108 and/or the second person 110 (a reaction time attribute) because the time of reaction and the time of the comment are known.

Other physical objects may be identified, and once identified, quality values and/or relevance values associated with the identified physical object may be determined. For example, FIG. 1 illustrates a movie theatre marquee 138 that is in the view field of the 360° video camera 102. The movie theatre marquee 138 is an inanimate physical object. This type of physical object may be associated with a location attribute since the movie theatre marquee 138 corresponds to a location, and since the movie theatre marquee 138 is known to be associated with public presentation of media content events. Here, this example location attribute may be associated with relatively high quality values and/or relevance values.

A relatively high quality value may be associated with the movie theatre marquee 138 because embodiments may infer that if the community member 104 is generating their commentary with the movie theatre marquee 138 visible in the acquired image information, it is highly likely that the community member 104 has recently viewed the subject media content event. Here, assuming that the community member 104 has just recently consumed the subject media content event, and therefore that it is highly likely that their commentary will be about their viewpoints concerning the recently viewed subject media content event, a relatively higher quality value may be determined.

Further, a relatively higher relevance value may be associated with the commentary. Here, the location attribute associated with the movie theatre marquee 138 would indicate that the content of the commentary is more likely to be highly relevant to the subject media content event because the community member 104 is likely to be discussing the subject media content event while outside of the movie theatre. That is, it may be reasonable to infer that the community member 104 is not likely to be discussing other topics that are unrelated to the subject media content event.

In some embodiments, the movie theatre marquee 138 may show the title of the currently presenting media content event that is being shown to the public. Here, the image data may be optionally analyzed using a text character recognition algorithm to identify the title of media content event indicated on the movie theatre marquee 138. A comparison of the identified title of the media content event indicated on the movie theatre marquee 138 may be compared with the title of the subject media content event that is the subject of the community member's commentary. If the titles of the subject media content event and the media content event indicated on the movie theatre marquee 138 are the same, then a relatively higher quality value and/or relevance value may be assigned to the commentary.

In contrast, other inanimate physical objects that are unrelated to viewing the subject media content event may be identified in the image information acquired by the 360° video camera 102. For example, background objects associated with a sporting event stadium may be identified, such as crowds of people who are sitting in close proximity to the community member 104, portions of the sporting event field of play, game play score signs, advertisements, etc. Here, location attributes associated with a sporting event stadium may be associated with relatively low quality values and/or relevance values because it is likely that the community member 104 is not discussing the subject media content event and/or is likely to be distracted by the game play at the sporting event stadium (such that their commentary may not be particularly relevant to the subject media content event).

Examples of other identifiable inanimate physical objects that may be unrelated to the subject media content event may include trees, vehicles, and home or office furniture. Examples of other animate objects include animals, such as pets or the like. These physical objects may be associated with particular locations (trees may be associated with park locations, vehicles may be associated with parking lots or when the community member 104 in transit, home or office furniture may be associated with a home or office, respectively). Here, the location attributes of these example locations are likely to be unrelated to the subject media content event, and therefore, have a relatively low quality value and/or relevance value.

However, some inanimate physical objects may be associated with the subject media content event. For example, the home furniture may be a television set. In this non-limiting example of home furniture that is identifiable in the image information acquired by the 360° video camera 102, it may be reasonable to infer that the community member 104 has recently viewed (or is even currently viewing) the subject media content event. Optionally, object recognition algorithms may be able to determine whether content is being viewed on the identified television, and may even be able to identify the particular media content event that is currently being presented on the television. If the currently presenting media content event has the same title as the subject media content event, then a relatively high quality value and/or relevance value may be determined since it is likely that the community member 104 is providing commentary about the subject media content event.

In some embodiments, the object recognition algorithm may determine if the entirety of a particular object is within the field of view of the 360° video camera 102. This information may later be used in post processing stages when the commentary is being processed for presentation to a requesting community member. Here, a remaining portion of the partially visible object may be synthesized and added to a video portion of the object (such as the speaking community member 104). Alternatively, the partially visible object may be replaced with another object or other graphic representation, such as an avatar or the like.

Optionally, range information (distance information) may be acquired by a suitable range finding device or depth sensor 114a. The acquired range information, when included as an integrated component of the 360° video camera 102, includes the range of the community member 104 and/or the range of other detectable physical objects in the field of view of the 360° video camera 102. The acquired range information may be analyzed to identify attributes of the speaking community member 104. These range attributes may then be used enhance the determination of the quality and/or relevance of the commentary of the community member 104.

In an example embodiment, the range from the community member 104 from the 360° video camera 102 (and/or the depth sensor 114a) is determined. Optionally, orientation information between the community member 104 and the 360° video camera 102 (and/or the depth sensor 114a) is determined. Then, the range from an identifiable physical object (such as another person) from the 360° video camera 102 (and/or the depth sensor 114a) is determined. Optionally, orientation information between the physical object and the 360° video camera 102 (and/or the depth sensor 114a) is determined. A geometric analysis of the determined range information, and optionally the determined orientation information, may then be performed to compute the range, and optionally the orientation, between the community member 104 and the identified physical object.

In some embodiments, the depth sensor 114a is a separate component that acquires range information while the 360° video camera 102 is acquiring image information. Once the distance and orientation of the depth sensor 114a to the 360° video camera 102 is known or determined, then the range of detectable physical objects and the community member 104 may be determined. Any suitable depth sensor 114a, and any suitable range and/or orientation determination process, may be used in the various embodiments.

Further, the acquired range information is preferably provided as a stream of information that includes time information that is used to synchronize the acquired range information of detected objects with the image capture times of those objects. Alternatively, if the range information is for a discrete time, then the time that the range information was acquired is included in the range information. Accordingly, the acquisition times of the required ranges can be synchronized with the time of image capture for the associated physical objects (which includes the community member 104).

The acquired range information may be used for additional purposes by the various embodiments and/or by other devices. For example, if a requesting community member is reviewing the acquired commentary of the community member 104 at a later time, the range information may be used to render a more accurate graphical representation of the speaking community member 104 that is presented to the requesting community member.

Optionally, audio information (sounds) may be acquired by a microphone 114b. Such acquired sounds are detectable in the environment 106. The acquired sound includes the voice of the community member 104 that is acquired by the microphone 114b while the community member 104 is speaking their commentary about the subject media content event. The acquired audio information may be analyzed to identify attributes of the voice of the speaking community member 104. These audio attributes may then be used enhance the determination of the quality and/or relevance of the commentary of the community member 104.

In some embodiments, the microphone 114b is a separate component that acquires sound information while the 360° video camera 102 is acquiring image information. The acquired sound information includes time information that is used for synchronizing the sound information with the image information acquired by the 360° video camera 102. Any suitable microphone 114b may be used in the various embodiments.

For example, various voice analysis algorithms may be used to determine an emotional state (an audio attribute) that is being experienced by the speaking community member 104. If the speaking community member 104 is in a highly excited and/or emotional state, embodiments may assume that the emotion may be a result of the viewing of the subject media content event, and therefore, may reasonably infer that the commentary is more genuine and/or honest. Accordingly, a higher relative quality value may then be associated with the community member's commentary. In contrast, if the community member 104 is not emotionally engaged while making their commentary, embodiments of the community member commentary acquisition system 100 may determine a relatively lower quality value associated with the community member's commentary. Any suitable voice analysis and emotional state determination system now known or later developed may be used by the various embodiments of the community member commentary acquisition system 100.

As another example, the truthfulness of the commentary (an audio attribute) being spoken by the community member 104 may be determined. That is, a determination may be made as to whether the community member 104 is telling the truth or if they are speaking untruthfully (such as by exaggerating or even lying). In an example embodiment, the emotional state of the community member 104 is determined based on the detected audio sounds of the speaking community member 104. If embodiments of the community member commentary acquisition system 100 determine that the community member 104 is speaking truthfully, then a higher relative quality value associated with the community member's commentary may be determined. In contrast, if embodiments of the community member commentary acquisition system 100 determine that the community member 104 is exaggerating, or is even lying, then a lower relative quality value associated with the community member's commentary may be determined. Any suitable truthfulness determination system now known or later developed may be used by the various embodiments of the community member commentary acquisition system 100.

Additionally, or alternatively, in some instances the first person 108 and/or the second person 110 may verbally react to the community member's commentary. For example, the first person 108 may state that they "agree" with the viewpoint being expressed by the community member 104. The audio content can be analyzed to identify the spoken words of the first person 108 in this simplified hypothetical example. The spoken words can be compared with a database of known key words that are associated with favoritism or disfavor. Accordingly, the quality value and/or the relevance value may be relatively higher if the words of the first person 108 are associated with favoritism. Conversely, the quality value and/or the relevance value may be relatively lower if the words of the first person 108 are associated with disfavor.

As another example, the first person 108 and/or the second person 110 may make a sound that can be identified that is associated with favoritism or disfavor. For example, laughing may be associated with favoritism about the community member's commentary. As another example, a clapping sound (resulting from a clapping gesture made by the first person 108) may be identified. The identified clapping sound may be compared with sounds in a database, and then matched with a clapping sound stored in the database. The identified clapping sound may then may be associated with favoritism based on a predefined association of favoritism for clapping sounds (since the identified sound of clapping corresponds to the predefined clapping sounds that have been associated with favoritism). Accordingly, the quality value and/or the relevance value may be relatively higher.

Other sounds that can be identified in the audio information acquired by the 360° video camera 102 may be matched with predefined sounds associated with favoritism or disfavor, and then the quality value and/or the relevance value may be relatively higher or lower, respectively. As another simplified hypothetical example, sounds associated with a movie theatre may indicate that the community member 104 who generated the commentary is at a movie theatre and has recently viewed, or is currently viewing, the subject media content event. Such sounds may include, but are not limited to, people ordering snacks at a concessions counter, audio advertisements for upcoming movies, and/or sounds from the audio tracks of media content events that are being presented in the theatre. Here, the commentary of the community member 104 may be associated with a relatively higher quality value and/or relevance value because the identified sounds are related to media content viewing.

As another example, the sound of a passing automobile or other vehicle, the sound of an automobile horn, or the like, may be detected. These example sounds may be compared with predefined sounds residing in a database of sounds, and when a predefined sound in the data base is found that corresponds to the detected sound, then the quality value and/or the relevance value may be determined. In this example, the sound of an automobile horn may have a low correlation with a media content event. Accordingly, the quality value and/or the relevance value may be relatively lower.

Optionally, the time of a detected and identified sound may be determined and correlated to the time of a particular comment made by the community member 104. This time attribute of the identified sound may then be considered when determining the quality value and/or the relevance value. A natural language synthesis algorithm may be used to identify the words of the community member's commentary at a particular time. Artificial intelligence algorithms can then be used to identify a particular comment, and then identify the intended meaning of that comment. Since the 360° video camera 102 is simultaneously acquiring the audio information, a time stamp or other time information may be used to associate the identified sound and a particular comment being made by the community member 104. The determined time attribute corresponding to the identified sound can be associated with the particular comment that was made at the time of the detection and identification of the sound.

Attributes about the environment surrounding the speaking community member 104 who is generating their commentary about the media content event may be determined. For example, but not limited to, an environmental temperature may be determined for the environment while the community member 104 is speaking. The environmental temperature may be determined from a thermometer or other temperature sensing device integrated within or that is external to the 360° video camera 102. Alternatively, or additionally, the environmental temperature may be obtained from an external source, such as a website or the like. Here, the temperature may correlate with the quality of the review, such as when the temperature is within a normal comfort range or if the temperature is extremely hot or cold. For example, an extremely hot or cold environmental temperature may indicate that the community member 104 was uncomfortable during the generation of their commentary, may have been rushing through the generation of their commentary, and/or may have been distracted during the generation of their commentary. Accordingly, the extremely hot or cold environmental temperature may result in a lower quality rating for the commentary. Conversely, a comfortable environmental temperature may result in a relatively higher quality rating since it is likely that the community member 104 was comfortable during the generation of the commentary.

Another non-limiting example environment attribute may be the lighting level in the environment during the generation of the commentary. Here, an unusually dark lighting level or high (bright) lighting level may indicate that the community member 104 was distracted during the generation of the commentary, thus resulting in a relatively lower quality rating for the commentary.

A variety of enhanced field of view image capture devices, generically referred to herein as a 360° video camera 102, are available to acquire video information that spans a 360 degree (360°) field of view, or substantially a 360° field of view, around the speaking community member 104. Some types of 360° video cameras 102 employ a single image capture device and a mirror, or system of mirrors, to acquire a 360° field of view video (referred to as an omnidirectional camera). Other types of 360° video cameras 102 may employ one or more individual cameras (having a limited field of view) and a plurality of lenses to acquire a 360° field of view video. Other types of 360° video cameras 102 employ two video cameras arranged in opposing directions (wherein each individual camera has approximately a 180° field of view) to acquire a video with a 360° field of view, or near 360° field of view. Other types of 360° video cameras 102 employ a plurality of limited field of view video cameras arranged in various directions to acquire a video with a 360° field of view, or near 360° field of view. Further these multiple video camera devices may be arranged to capture stereoscopic images, wherein the acquired image information may be processed to create a three dimensional (3-D) effect when the 360° field of view video is viewed by a community member who is using a suitable 3-D projection viewing device (not shown). Any image capture device and/or system now known or later developed may be used by the various embodiments of the community member commentary acquisition system 100.

In addition to acquiring image information spanning a 360° field of view video (in mono view or in stereoscopic view), some 360° video cameras 102 are also able to acquire overhead images and/or low level or ground level images. With such 360° video cameras 102, a spherical, a substantially spherical, or a hemispherical video images can be acquired. For purposes of this disclosure, the 360° field of view video image information is disclosed as corresponding to a spherical video image, a substantially spherical video image, a hemispherical video image, or a 360° field of view panoramic video image with a predefined vertical field of view range.

When a plurality of individual video cameras are employed in the 360° video camera 102, separately acquired video images captured by each one of the individual video cameras must be "stitched" together so that a 360° field of view video image may be presented to a viewer. Here, "stitching" together the individual video image portions to create a single 360° field of view video image is defined as the process of combining individual video still images together at their overlapping points to create a single unified 360° field of view. Some embodiments of the community member commentary acquisition system 100 may perform this stitching process to create a 360° field of view video image. Alternatively, or additionally, embodiments may receive 360° field of view video image information that has already been stitched together by the 360° video camera 102 or another image processing device. Additionally, the 360° field of view video image may be further processed into a projected image format that is suitable for presentation on a flat surface, such as a display device. Then, embodiments of the community member commentary acquisition system 100 can analyze the entirety of the 360° field of view video image information in an image frame to acquire information that is used to define quality and/or relevance attributes that are associated with the community member 104 and/or that is associated with the subject media content event.

However, some embodiments of the community member commentary acquisition system 100 do not need to stitch together or otherwise generate 360° field of view video image information. Rather, such embodiments may separately analyze the video information acquired from each individual video camera to identify the physical objects discernible in the environment 106. Here, since the image frames of the individual videos are time synchronized together in a serial fashion, and since the spatial relationship of individual video cameras with respect to each other is known (by virtue of the construction and arrangement of the individual video cameras in the 360° video camera 102), objects identified from individual time synchronized video frames may be correlated together with respect to location and time so that the quality and/or relevance attributes of the commentary of the community member 104 can be defined.

Embodiments of the community member commentary acquisition system 100 comprise the community member commentary generator 116 that receives and processes information acquired from a 360° video camera 102 while the community member 104 was providing their commentary about the subject media content event. Based on identified objects in the 360° field of view video information and/or sounds identified in the audio information, a quality value and/or a relevance value of the community member's commentary is determined. The determined quality and/or relevance values are then communicated to the content community platform 118 via the communication network 120.

In some embodiments, the community member commentary generator 116 may be a component of the content community platform 120. In other embodiments, the community member commentary generator 116 may be a component of the 360° video camera 102 and/or the optional commentary receiving device 122.

The content community platform 118 comprises a commentary avatar generator 124, a community commentary storage device 126, community member information 128, a member avatar storage device 130, and a content community manager 132. Other components (not shown) may be included in the content community platform 118 which perform other functions and/or operations. Some embodiments of the content community platform 118 may omit one or more of the described components, and/or such component may be distributed remotely from the content community platform 118.

In practice, the 360° video camera 102 acquires video and/or audio information while the community member 104 is making their commentary about the subject media content event. The expressed commentary of the community member 104 acquired by the 360° video camera 102 is then communicated to the community member commentary generator 116, and is stored into the community member commentary storage device 126 for later processing. Over time, the commentary for many hundreds of different community members, or even thousands of community members, can be acquired.

The community member information 128 is a storage device or memory medium that stores information about each of the community members of the content community. Information may include a unique identifier of the community member, such as their name or other suitable identifier. The stored information may include account information and/or information about electronic devices that the associated community member owns and/or uses. Relationship information that corresponds to the affinity and/or interpersonal relationships of that community member to other community members may be included in the community member information 128. The information about the community members may be used to determine the relevance value associated with the community member's commentary. Therefore, one skilled in the art appreciates that a single commentary may have a plurality of different relevance values each determined for different interpersonal relationships. In some embodiments, the relevance value may be determined and/or adjusted in response to a request of a community member for commentary pertaining to a specified subject media content event. Embodiments may then evaluate the interpersonal relationships between the requesting community member and the community members 104 who have provided commentary, and then adjust the relevance value based on the identified interpersonal relationships, if any.

In practice, the commentary avatar generator 124 residing in the content community platform 118 accesses a received community member commentary that is stored in the community member commentary storage device 126. The accessed commentary of the community member 104 is then processed into a form that is suitable for presentation to a requesting community member on a suitable display. In some embodiments, selected commentaries are presented as graphical avatars when the requesting community member is experiencing a 360° virtual world using a suitable presentation device, such as a head mounted display or the like. Part of the processing includes generation of an animated member avatar that graphically depicts the commentary of the community member 104.

The animated community member avatars are stored into the member avatar storage device 130. An animated avatar, when presented to a requesting community member on a suitable display, appears to be speaking the commentary of the community member 104. Each community member's content review for a particular subject media content event, and the associated member avatar, are stored in the member avatar storage device 130. An example animated member avatar generation and presentation process is described in commonly assigned U.S. patent application Ser. No. 15/906,130 filed on Feb. 27, 2018, which is incorporated herein by reference in its entirety.

The processes of receiving community member's commentary, generating and storing commentary avatars, and then selecting particular available community member's commentaries for a particular requesting community member, is managed by the content community manager 132.

One skilled in the art appreciates that in a large content community environment, for any particular media content event, there may be hundreds of, or even thousands of, different community member commentaries available for presentation (as member avatars) to the requesting community member. In practice, embodiments of the content community platform 118 are configured to identify particular ones of the available commentary that the requesting community member is likely to want to consume (view) based, in part, upon the commentary rating of that particular community member's commentary. The commentary rating is determined based on the quality value and/or the relevance value associated with the community member's commentary. Accordingly, embodiments of the content community platform 118 identify a manageable number of member avatars that present content reviews that are to be available to the community member for selection and presentation while they are experiencing their 360° virtual world. The selection of particular commentaries for a requesting community member is based, in part, upon the commentary rating that is based on the quality values and/or relevance values associated with the available community member commentaries as determined by embodiments of the community member commentary acquisition system 100.

When a community member 104 is operating the 360° video camera 102 to capture (acquire) their commentary about a subject media content event, the 360° video camera 102 may use a suitable wireless signal 134 to communicate the captured video and audio information to the community member commentary generator 116 via the communication network 120. Alternatively, the 360° video camera 102 may use a suitable wireless signal 136 to communicate the captured video and audio information to the optional commentary receiving device 122, which then communicates the information to the community member commentary generator 116 via the communication network 120. Alternatively, the 360° video camera 102 may be communicatively coupled to the commentary receiving device 122 and/or the via a suitable wire-based connector (not shown). In embodiments where the community member commentary generator 116 and the 360° video cameras 102 are integrated together, the commentary and the determined quality and/or relevance values of the community member's commentary may be communicated to the content community platform 118 via the communication network 120.

In the various embodiments, the communication network 120 communicatively coupled the 360° video cameras 102, the community member commentary generator 116, the content community platform 118, and the optional commentary receiving device 122 with each other. The communication network 120 is illustrated as a generic communication system. In one embodiment, the communication network 120 comprises a cellular telephone system, such as a radio frequency (RF) wireless system. Alternatively, the communication network 120 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, alternative embodiments may be implemented to communicate using other types of communication technologies, such as but not limited to, digital subscriber loop (DSL), X.26, Internet Protocol (IP), Ethernet, Integrated Services Digital Network (ISDN) and asynchronous transfer mode (ATM). Also, alternative embodiments may be configured to communicate over combination systems having a plurality of segments which employ different formats for each segment that employ different technologies on each segment.

Figure 2:
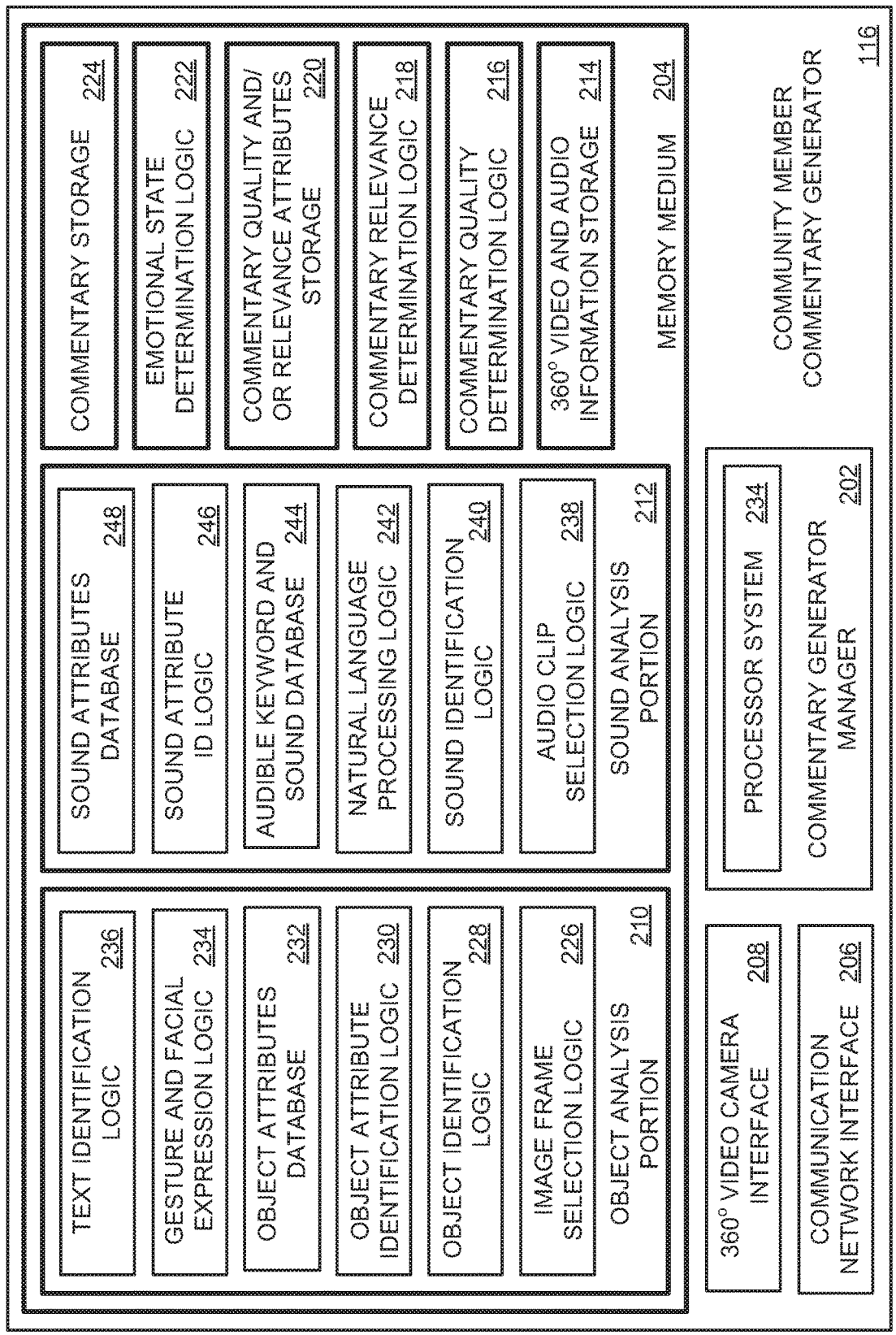
FIG. 2 is a block diagram of an example embodiment of a community member commentary generator.

FIG. 2 is a block diagram of an example embodiment of a community member commentary generator 116. The non-limiting embodiment of the community member commentary generator 116 comprises a commentary generator manager 202, a memory medium 204, a communication system interface 206, and an optional 360° video camera interface 208. The exemplary memory medium 204 comprises an object analysis portion 210, a sound analysis portion 212, the 360° video camera and audio information storage 214, the commentary quality determination logic 216, the relevance determination logic 218, the commentary quality and/or relevance attributes storage 220, the emotional state determination logic 222, and the commentary storage 224.

The exemplary object analysis portion 210 of the memory medium 204 comprises the image frame selection logic 226, the object identification logic 228, the object attribute identification logic 230, the object attributes database 232, the gesture and facial recognition logic 234, and the text identification logic 236. The object analysis portion 210 of the memory medium 204 identifies one or more physical objects that are visible in the video portion of the commentary that has been acquired by the 360° video camera 102. Identified physical objects are associated with one or more attributes. These attributes are associated with a quality value and/or relevance value.

The exemplary sound analysis portion 212 of the memory medium 204 comprises the audio clip selection logic 238, the sound identification logic 240, the natural language processing logic 242, the audible keyword and sound database 244, the sound attribute identification logic 246, and the sound attributes database 248. Similarly, the sound analysis portion 212 of the memory medium 204 identifies one or more sounds in the audio portion of the commentary that has been acquired by the 360° video camera 102. Identified sounds are associated with one or more attributes. These attributes are associated with a quality value and/or relevance value.

In some embodiments, the commentary quality determination logic 216, the relevance determination logic 218, the emotional state determination logic 222, the image frame selection logic 226, the object identification logic 228, the object attribute identification logic 230, the gesture and facial recognition logic 234, the text identification logic 236, the audio clip selection logic 238, the sound identification logic 240, the natural language processing logic 242, and/or the sound attribute identification logic 246 may be integrated together, and/or may be integrated with other logic. In some embodiments, the 360° video camera and audio information storage 214, the commentary storage 224, the object attributes database 232, the sound attributes database 248, and/or the audible keyword and sound database 244 may be integrated together, may be integrated with other information, and/or may reside in other memory medium that is local and/or that is remote from the community member commentary generator 116. In other embodiments, some or all of these memory and other data manipulation functions may be provided by using a remote server or other electronic devices suitably connected via the Internet or otherwise to a client device. Other embodiments may include some, or may omit some, of the above-described components. Further, additional components not described herein may be included in alternative embodiments.

In the context of this specification, the memory medium(s) include a "computer-readable medium" that can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). The computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Further, the described portions of the memory medium 204 may be commonly located, remotely located, may include a plurality of memory mediums commonly located, and/or may include a plurality of memory mediums that are distributed among different locations.

The exemplary commentary generator manager 202 includes a processor system 234 that manages the various processes performed by embodiments of the community member commentary acquisition system 100. Processor system 234 is typically a commercially available processor system that is configured (is operable) to access the various logic residing in the memory medium 204, and store and/or retrieve information into and from the memory medium 204 and other memory mediums as required to perform the functionality of the various embodiments of the community member commentary acquisition system 100. Furthermore, for convenience of illustration in FIG. 2, processor system 234 is shown residing in the commentary generator manager 202. In other embodiments, the processor system 234 may reside in alternative convenient locations outside of the commentary generator manager 202, as components of other systems, or as stand alone dedicated elements, without adversely affecting the operation and functionality of the community member commentary acquisition system 100. Any such alternative embodiments of a community member commentary acquisition system 100 are intended to be within the scope of this disclosure and be protected by the accompanying claims.

In practice, the 360° video camera 102 acquires video and/or audio information while the community member 104 is making their commentary about the subject media content event. The community member 104 initiates capture of their commentary by actuation or starting operation of the 360° video camera 102. Accordingly, the community member commentary generator 116 is able to determine the beginning (start) of the community member's commentary. However, other means of indicating the beginning of the commentary may be used. For example, the community member 104 may verbally state that the commentary is beginning. A natural language algorithm or the like that is able to determine spoken words in captured audio information may identify the statement being made by the community member 104 that indicates the start of the commentary. Alternatively, or additionally, the community member 104 may actuate a particular controller on the 360° video camera 102 to indicate the beginning of their commentary. Any suitable means and/or indicator can be used by the various embodiments such that the community member commentary generator 116 is able to identify the beginning of the commentary.

Similarly, the community member 104 also concludes capture of their commentary. The community member 104 concludes capture of their commentary by stopping operation of the 360° video camera 102. Accordingly, the community member commentary generator 116 is able to determine the conclusion (end) of the community member's commentary. However, other means of indicating the conclusion of the commentary may be used. For example, the community member 104 may verbally state that the commentary is ending. Alternatively, or additionally, the community member 104 may actuate a particular controller on the 360° video camera 102 to indicate the conclusion of their commentary. Any suitable means and/or indicator can be used by the various embodiments such that the community member commentary generator 116 is able to identify the conclusion of the commentary.

Further, the community member 104 must also identify the subject media content event. In some instances, the community member 104 may verbally identify the subject media content event by speaking the name, title or other identifier of the subject media content event. A natural language algorithm or the like that is able to determine spoken words in captured audio information may identify the statement being made by the community member 104 that indicates the identity of the subject media content event. In other instances, a suitable user interface may be available on the 360° video camera 102 which permits the community member 104 to specify the name, title or other identifier of the subject media content event. Any suitable means and/or indicator can be used by the various embodiments such that the community member commentary generator 116 is able to identify the subject media content event.

In the various embodiments of the community member commentary acquisition system 100, the expressed commentary of the community member 104 acquired by the 360° video camera 102 is then communicated to the community member commentary generator 116, preferably via the communication network 120, and is received at the communication network interface 206. The communication network interface 206 is any suitable interface that communicatively couples the community member commentary generator 116 to a 360° video camera 102 and/or to a commentary receiving device 122. The community member commentary generator 116 may be communicatively coupled to the communication network 120 using any suitable wireless and/or wire-based communication medium, process, and/or system.

Alternatively, in some embodiments of the community member commentary acquisition system 100, the expressed commentary of the community member 104 acquired by the 360° video camera 102 may be communicated to the community member commentary generator 116, preferably via the communication network 120, and is received at the 360° video camera interface 208. The 360° video camera interface 208 is any suitable interface that communicatively couples the community member commentary generator 116 to a 360° video camera 102. The community member commentary generator 116 may be communicatively coupled to the communication network 120 and/or a 360° video camera 102 using any suitable wireless and/or wire-based communication medium, process, and/or system.

The received commentary (video and/or audio information) and the associated name, title or other identifier of the subject media content event, is stored into the 360° video and audio information storage 214 portion of the memory medium 204. At some point after the commentary has been acquired by the 360° video camera 102 and has been communicated to the community member commentary generator 116 and stored in the 360° video and audio information storage 214 portion of memory medium 220, embodiments of the community member commentary acquisition system 100 process the acquired video and/or audio information. This processing of acquired video and/or audio information is, in an example embodiment, performed by the commentary generator manager 202 under the control of the processor system 234 executing the various logic residing in the memory medium 204 and/or residing in other suitable memory medium. During the processing, portions of the acquired commentary video information are analyzed to identify one or more physical objects in the video information. Alternatively, or additionally, portions of the acquired commentary audio information are analyzed to identify one or more sounds in the audio information. Based on attributes of the identified physical objects and/or identified sounds, a quality value and/or a relevance value associated with the community member's commentary may be determined.

The video portion of the commentary that has been acquired by the 360° video camera 102 comprises a plurality of time sequenced serially ordered of still images. The still images are commonly referred to in the art as an image frame. One skilled in the art appreciates that when the series of time sequenced image frames are presented on a display, the viewer perceives a video image. Here, the image frame selection logic 226 accesses (picks) a selected one of the image frames in the received video portion of the commentary that has been acquired by the 360° video camera 102. The selected image frame will image include information pertaining to one or more physical objects (in additional to a still image of the community member 104 who made the commentary using their 360° video camera 102).

Depending upon the type of 360° video camera 102, for a given instant in time, the entire field of view captured by the 360° video camera 102 will be in a single image frame. However, some 360° video cameras 102 employ multiple image capture devices (cameras) to provide a large field of view. Accordingly, for a single instant in time, the 360° video camera 102 may capture multiple image frames, wherein each image frame is captured by one of the image capture devices. Within the context of this disclosure, "processing the image frame" to identify physical objects as described herein refers either to processing a single image frame that spans the entire field of view acquired by the 360° video camera 102, or processing all image frames concurrently captured at the same instant of time when the 360° video camera 102 employs a plurality of image capture devices, or processing a synthesized image frame constructed from the plurality of individual image frames that were concurrently captured by the plurality of image capture devices employed by the 360° video camera 102.

Once a selected image frame has been picked for analysis, the object identification logic 228 is used to identify one or more physical objects that are visible in the field of view of the selected image frame. The identified physical object may be individuals listening to the community member 104. Alternatively, or additionally, identified physical objects may be other individuals who simply happen to be visible in the selected image frame (and who are not listening to the community member 104). Alternatively, or additionally, other living physical objects (trees, animals, etc.) or other non-living physical objects may be identified in the environment 106 about the community member 104 during generation of the commentary by the community member 104.

Once a particular physical object has been identified in a processed image frame, the object attribute identification logic 230 identifies one or more attributes pertaining to the identified object, and then associates the attribute(s) with the physical object. An attribute is any characteristic that may be used to identify and/or describe the physical object. For example, if the physical object is a person (an attribute), then the attribute "person" (or the like) is associated with that particular physical object. If the name (an attribute) of the person can be determined, then the name is alternatively or additionally associated with the physical object. In the various embodiments, an identified object may have one, or may have a plurality, of associated attributes which describe the identified physical object.

Once one or more attributes have been determined for a particular physical object, the identified attribute(s) is compared with a database of predefined attributes stored in the object attributes database 232. The object attributes database 232 is any suitable database that identifies physical object attributes that describe characteristics of, and that are associated with, a particular physical object. For each physical object attribute, the database information further includes a quality value and/or a relevance value that is associated with that particular physical object attribute. When a match between the attributes of an identified physical object in the video information acquired by the 360° video camera 102 and a database physical object attribute, the quality value and/or relevance value may be accessed and then may be associated with that identified physical object.

For example, the identified physical object may be the first person 108 (FIG. 1) who is identified by the object identification logic 228. In this simplified hypothetical example, the first person 108 is standing in front of the community member 104. Here, the physical object attribute of a "person" may be determined by the object attribute identification logic 230 for the physical object identified in the selected image frame. Here, a relatively high quality value may tend to indicate that if this physical object (the first person 108) is identified in an image frame in front of the speaking community member 104, it is very likely that the community member 104 is directing their commentary towards the recently consumed movie (the subject media content event). Further, the relatively high relevance value may tend to indicate that most of the community member's commentary pertains to the movie that they are discussing with the first person 108.

Optionally, the range of the first person 108 from the community member 104 may be determined. If the range is relatively short, a higher quality value and/or relevance value may be determined because it is very likely that the community member 104 is speaking directly to the first person 108. On the other hand, if the determined range between the first person 108 and the community member 104 is relatively large, a lower quality value and/or relevance value may be determined (since it might be possible that the community member 104 is not speaking directly to the first person 108).

In contrast to the identified first person 108, an identified physical object may be a the second person 110 (FIG. 1) who is identified by the object identification logic 228. In this simplified hypothetical example, the second person 110 is illustrated as standing behind the community member 104. Here, the physical object attribute of a "person" may be determined for the physical object identified in the selected image frame by the object attribute identification logic 230. However, a relatively low quality value associated with the second person 110 may be determined. The low quality value may tend to indicate that if this physical object (the second person 110) is identified in the selected image frame as being behind the speaking community member 104, it is very likely that the community member 104 might not necessarily be directing their commentary towards the recently consumed movie (the subject media content event) since the second person 110 is behind the community member 104. Further, a lower relevance value associated with the second person 110 may tend to indicate that most of the community member's commentary pertains to the movie that they are discussing with the first person 108.

Further, an optional range of the second person 110 to the community member 104 may be determined. If the range is relatively large, then an even lower quality value and/or relevance value may be determined for that physical object (because it is not likely that the community member 104 is speaking to the second person 110).

Optionally, some embodiments may identify a plurality of people in the selected image frame. Some of these people may be in close proximity to the community member 104, and within a predefined angle of view in front of the community member 104. Those identified people that are within a predefined range threshold and that are within the predefined angle of view in front of the community member 104 may be determined to be an audience of people who are listening to the community member 104 who is speaking about the subject media content event during the generation of their commentary being captured by the 360° video camera 102. Here, the determined number of people in front of the community member and that are also within a predefined range threshold may be assumed to be listening to the community member 104. The determined quality value and/or relevance value of the community member's commentary may be increased or decreased based on the number of people who are members of the audience. If the number of people in the audience is large, then a relatively higher quality value and/or relevance value may be defined for the community member's commentary. Here, predefined numbers of people in an audience may have associated quality values and/or relevance values. When a match between one of the predefined numbers in the database match the identified number of people in the audience, then the corresponding quality value and/or relevance value may be accessed and then may be associated with the community member's commentary.

A series of number thresholds, each corresponding to the number of people in the audience, may be used to define the quality value and/or relevance value of the community member's commentary. For example, if the number of people is between a first threshold value and a higher second threshold value, then a first quality value and/or relevance value may be determined for the community member's commentary. If the number of people exceeds the second threshold, then a higher second quality value and/or relevance value of the community member's commentary may be determined. If the number of people exceeds a higher third threshold, then an even higher third quality value and/or relevance value of the community member's commentary may be determined.

Conversely, the quality value and/or relevance value of the community member's commentary may be decreased based on a number of people who are farther than a predefined threshold range from the community member 104 and/or that are outside of the predefined angle of view in front of the community member 104. For example, if a large number of people are outside of the predefined field of view, even if they are relatively close (within the predefined range threshold) to the community member 104, a lower quality value and/or relevance value of the community member's commentary may be determined (because it is likely that community member 104 was not speaking to an audience, but rather, was speaking about the subject media content event while in the midst of a large crowd of people who were not listening to the community member 104).

Once a person is identified as a physical object in a selected image frame, the gesture and facial recognition logic 234 can identify a gesture being made by the identified person. The identified gesture(s) may be associated with a gesture attribute by the object attribute identification logic 230. For example, if the person is nodding their head in apparent agreement (an attribute of a gesture expression), then this attribute may be compared with the attributes of the object attributes database 232. When a corresponding "head nodding" attribute is found in the object attributes database 232, the quality value and/or relevance value of the community member's commentary can be determined based on the associated quality value and/or relevance value associated with the head nodding attribute residing in the object attributes database 232. Other gestures may be identified, their attributes identified, and then compared with gesture attributes in the object attributes database 232 to determine the quality value and/or relevance value of the community member's commentary.

Similarly, once a person is identified as a physical object in a selected image frame, the gesture and facial recognition logic 234 can identify facial features of the identified person. The identified facial features may be associated with a facial feature attribute by the object attribute identification logic 230. For example, if the person is smiling (an attribute of a facial expression), then this attribute may be compared with the attributes of the object attributes database 232. When a corresponding "smiling" attribute is found in the object attributes database 232, the quality value and/or relevance value of the community member's commentary can be determined based on the associated quality value and/or relevance value associated with the smiling attribute residing in the object attributes database 232. Other facial features may be identified, their attributes identified, and then compared with facial attributes in the object attributes database 232 to determine the quality value and/or relevance value of the community member's commentary.

Conversely, the facial recognition logic 234 might identify the back of the head of the identified person. If the person's back of their head is identified, then this attribute would indicate that the person is not listening to the speaking community member 104. Accordingly, a relatively lower quality value and/or relevance value may be determined for the community member's commentary.

As another non-limiting example of an identifiable physical object, the movie theatre marquee 138 (see FIG. 1) that is visible in the view field of the 360° video camera 102 may be an identified physical object by the object identification logic 228. Here, the object attribute identification logic 230 may then determine that the object is a movie theatre marquee. The attribute "movie theatre marquee" or "movie theatre" or the like may then be associated with the physical object, here the movie theatre marquee 138. A relatively high quality value may tend to indicate that if this physical object (the movie theatre marquee 138), it is very likely that the community member 104 has recently viewed the movie, and is therefore directing their commentary towards the recently consumed movie (the subject media content event). Further, the relatively high relevance value may tend to indicate that most of the community member's commentary pertains to the movie.

The image information in the selected image frame for the movie theatre marquee 138 may further include identifiable text that indicates the name (an attribute) of the current movie that is being shown at the movie theatre. The text identification logic 236 may be used to identify any visible text in the image information shown on the movie theatre marquee 138. The text identification logic 236 may include suitable natural language determination logic that is able to identify the name of the movie indicated on the marquee from the identified text. Here, the name of the movie is an attribute associated with the movie theatre marquee 138.

In some situations, where the title of the movie being shown at the movie theatre can be determined from the image information in the selected image frame, embodiments may compare the determined movie title with the identified subject media content event. If the title of the movie being shown at the movie theatre matches the identifier of the subject media content event, then a relatively high quality value and/or relevance value may be determined for that community member's commentary.

In contrast, other types of physical objects may be identified in a processed image frame. For example, a sporting event stadium may be identified. A physical object attribute of the object attributes database 232 may include the attribute "sporting event stadium" that has an associated relatively low quality value and/or relevance value. Here, the relatively low quality value may tend to indicate that if this physical object (a sporting event stadium) is identified in an image frame, it is very likely that the community member 104 is directing at least a portion of their commentary towards other topics, such as the sporting event, that are not related to the subject media content event. Further, it may be reasonable to infer that their commentary, if directed to a particular media content event, is not likely very fresh in their mind at the time of commentary generation (under an inference that they are or have attended a sporting event at the sporting event stadium).

It is appreciated by one skilled in the art that the video portion of the commentary that has been acquired by the 360° video camera 102 may span some determinable period of time (duration). Some embodiments are optionally configured to select other image frames for image analysis in addition to the first selected image frame. Image frames may be periodically selected based on a predefined period, may be selected based on predefined times in the commentary, and/or may be separated from each other by some predefined period. Physical objects identified in one selected image frame, and optionally their determined attributes, may be compared with the physical objects (and optionally their attributes) identified in other selected image frames. The quality values and/or relevance values of the community member's commentary may be adjusted based on the comparison.

For example, if the same people are identified in multiple selected image frames, and/or if the identified people are in the same location relative to the community member 104, then a relatively higher quality value and/or relevance value may be determined under an inference that the community member 104 is speaking to an audience (because the audience members are stationary between the different times of the image frames). Conversely, if different people are identified in multiple selected image frames, and/or if the identified people are in different locations about the community member 104 in the different image frames, then a relatively lower quality value and/or relevance value may be determined under an inference that the community member 104 is not speaking to an audience, and/or under an inference that the identified people in the different image frames are not engaged with the speaking community member 104. Any suitable number of image frames, and any suitable time or duration in or between selected image frames, may be evaluated by the various embodiments.

The audio portion of the commentary that has been acquired by the 360° video camera 102 may also be evaluated when the quality value and/or relevance value of the community member's commentary is determined. The audio clip selection logic 238 selects a portion of the audio portion of the community member's commentary. The sound identification logic 240 identifies sounds in the selected audio clip. The sounds in the selected audio clip may be caused by the voices of speaking people and/or by various physical objects (such as a sound emitted by an automobile horn, for example).

For each identified sound, the sound attribute identification logic 246 determines an attribute that is then associated with the identified sound. The sound attribute is compared with attributes stored in the sound attributes database 248. Each sound attribute that describes characteristics about a particular sound is stored in the sound attributes database 248. Each sound attribute is associated with a quality value and/or relevance value. If the sound attribute associated with the sound identified in the selected audio clip corresponds to one of the sound attributes in the sound attributes database 248, then the associated quality value and/or relevance value can be accessed and then associated with the identified sound to determine the quality value and/or relevance value of the community member's commentary.

For example, if the sound of an automobile horn is identified in the sounds found in the selected audio clip, the attribute of "automobile horn" or the like is associated with that selected audio clip. Here, a relatively lower quality value and/or relevance value may be associated with this attribute since it is reasonable to infer that the community member 104 is being distracted by the horn sound, and/or is engaged in other activities such as travelling, and/or is at a location that is not associated with providing commentary about a media content event.

Other sounds may have attributes that are associated with a relatively high quality value and/or relevance value. For instance, if the sounds are typically heard in a movie theatre, it is reasonable to infer that the community member's commentary has a relatively high quality value and/or relevance value (since it is reasonable to infer that the community member 104 is currently consuming, or has recently consumed, the subject media content event).

In some instances, the identified sounds in the selected audio clip are voices of speaking people. The natural language processing logic 242 may identify the words of detected speech. And, the meaning of the words or phrases may then be determined. In an example embodiment, words and/or phrases identified in the selected audio clip are defined as attributes. The identified words and/or phrases may be compared with keywords and/or keyword phrases residing in optional audible keyword and sound database 244. When a keyword or keyword phrase match is found, then the attributes associated with the matching keyword or keyword phrase may be accessed from the audible keyword and sound database 244, and then may be used to determine the quality value and/or relevance value of the community member's commentary.

For example, the first person 108 may state that "I agree with your observation" to the community member 104. Here, one skilled in the art appreciates that the determined quality value of the community member's commentary may be determined, based on the identified keyword phrase, to be relatively high since the first person 108 is apparently agreeing with the community member's statements about the subject media content event. On the other hand, the first person 108 may state that "I disagree with your observation" to the community member 104. Here, one skilled in the art appreciates that the determined quality value of the community member's commentary may be determined to be relatively low since the first person 108 is apparently disagreeing with the community member's statements about the subject media content event. Here, embodiments determine that the physical object, who is a person, is verbally disagreeing with the commentary of the community member 104 based on identified spoken words.

Similar to analyzing a plurality of selected image frames, some embodiments may analyze a plurality of selected audio clips and/or the entirety of the audio portion of the commentary. Further, identified sounds may include the spoken words and/or phrases of the community member's commentary. Sound attributes may be determined from the detected words and/or phrases in the spoken community member's commentary. Such attributes may then be used to determine the quality value and/or relevance value of the community member's commentary.

For example, the optional emotional state determination logic 222 may be used to determine the emotional state of the community member 104 while they are generating their commentary about the subject media content event. In a preferred embodiment, the emotional state is determined based on information from the video portion of the commentary that has been acquired by the 360° video camera 102.

Alternatively, or additionally, facial features and or gestures may be used to determine an emotional state of the community member 104. For example, waving of the hands of the community member 104 may be associated with a highly excited emotional state. Here, the community member 104 may be assumed to be in an enthusiastic state.

Characteristics of the detected speech of the community member 104 may indicate emotional state. For example, speed of speech, pitch of voice, volume of voice may be used to infer emotional state of the community member 104 who is speaking their commentary about the subject media content event.

If the determined emotional state of the community member 104 is high while they are generating their commentary about the subject media content event, then a relatively high quality value and/or relevance value may be determined since it is reasonable to infer that the community member 104 is emotionally engaged in the generation of their commentary. If the emotional state of the community member 104 is relatively low, then a relatively lower quality value and/or relevance value may be determined since it may be reasonable to infer that the community member 104 is not highly engaged in the generation of their commentary.

Alternatively, or additionally, keywords or phrases stored in the audible keyword and sound database 244 may optionally be associated with an emotional state of the community member 104. When such keywords or phrases are spoken by the community member 104 during generation of their commentary about the subject media content event, then the emotional state of the community member 104 can be determined. For example, the phrases "I really liked" or "I really disliked" may be associated with a relatively high emotional state of the community member 104.

Optionally, the frequency of occurrence of keywords or keyword phrases may be used to determine the quality value and/or relevance value. If the community member 104 speaks a keyword or keyword phrase associated with enthusiasm or the like multiple times, then a relatively higher quality value and/or relevance value of the community member's commentary may be determined. If the community member 104 speaks a keyword or keyword phrase associated with a disinterest or the like multiple times, then a relatively lower quality value and/or relevance value of the community member's commentary may be determined.

Alternatively, or additionally, keywords or phrases stored in the audible keyword and sound database 244 may optionally be associated with an emotional state of the people listening to the speaking community member 104. When such keywords or phrases are spoken by the other people in proximity to the speaking community member 104 during generation of the commentary about the subject media content event, the emotional state of the other people can be determined. For example, the phrases "I really agree with" or "I really disagree with" may be associated with a relatively high emotional state of the person listening to the commentary of the community member 104. If the other persons speaks the phrase "I really agree with" one or more times, then a relatively higher quality value and/or relevance value of the community member's commentary may be determined. Conversely, if the other persons speaks the phrase "I really disagree with" one or more times, then a relatively lower quality value and/or relevance value of the community member's commentary may be determined. That is, the emotional state of the people speaking in the dialogue occurring between the other people and/or the community member 104 may be used to determine the quality value and/or relevance value of the community member's commentary.

In the various embodiments, the commentary quality determination logic 216 is used to determine the quality value of a particular community member's commentary. As previously noted, the quality value is a numerical value that corresponds to the quality of the commentary of the community member 104 relative to the subject media content event of interest. The quality value is an indicator of the degree to which a viewer (consumer) of the commentary, here the requesting community member, is likely to be satisfied by the commentary about the subject media content event.

The commentary generator manager 202, executing the commentary quality determination logic 216, determines the quality value for the community member's commentary based on the quality values associated with the identified physical objects and the identified sounds from the video and audio portions, respectively, of the commentary that has been acquired by the 360° video camera 102 during generation of the community member's commentary. The quality value for the community member's commentary may be determined in a variety of manners by different embodiments.

In a first example embodiment, the quality value for the community member's commentary is a summation of the individual quality values associated with the identified physical objects and the identified sounds from the video and audio portions, respectively. The determined quality value of the community member's commentary is then saved into the commentary quality and/or relevance attributes storage 220 of the memory medium and/or is saved into another suitable memory medium.

In a second example embodiment, the quality values associated with the identified physical objects and the identified sounds from the video and audio portions, respectively, are weighted, and are then added together. Weighting factors for identified physical objects may be stored in the object attributes database 232 and would be associated with particular physical objects or sounds residing in the attributes database 232. Similarly, weighting factors for identified physical objects may be stored in the sound attributes database 248. Here, some types of identified physical objects and sounds have a higher weighting than other types of identified physical objects and sounds. For example, an identified physical object that is far away (large range value) may be less weighted than an identified physical object that is very close to the community member 104. As another example, an identified physical object that has an attribute that is unrelated to content may be less weighted than an identified physical object that is related to the subject media content event. As another example, an identified sound that has a low volume (and is therefore presumably made by a sound source that is far away from the community member 104) may be less weighted than an identified sound that has a relatively high volume (and is therefore presumably made by a sound source that is close to the community member 104).

In some embodiments, the quality value for the commentary may be normalized to some standard basis or per unit basis. After normalization, all commentaries for a particular subject media content event will have a quality value that can be meaningfully compared to the quality values of the other commentaries. Any suitable normalization or other statistical analysis process may be used by the various embodiments so that the quality value for individual commentaries can be meaningfully compared with each other.

In the various embodiments, the commentary relevance determination logic 218 is used to determine the relevance value of a particular community member's commentary. As previously noted, the "relevance value" is defined herein is a weighting value that corresponds to the relevance of the content of the commentary relative to the subject media content event with respect to the views of a requesting viewer who views the commentary. The relevance value as applied to commentary is an indicator of the degree to which subject matter of the commentary is relevant to the subject media content event.

The commentary generator manager 202, executing the commentary relevance determination logic 218, determines the relevance value for the community member's commentary based on the quality values associated with the identified physical objects and the identified sounds from the video and audio portions, respectively, of the commentary that has been acquired by the 360° video camera 102 during generation of the community member's commentary. The relevance value for the community member's commentary may be determined in a variety of manners by different embodiments.

In a first example embodiment, the relevance value for the community member's commentary is a summation of the individual relevance values associated with the identified physical objects and the identified sounds from the video and audio portions, respectively. The determined relevance value of the community member's commentary is then saved into the commentary quality and/or relevance attributes storage 220 of the memory medium 204 and/or is saved into another suitable memory medium.

In a second example embodiment, the relevance values associated with the identified physical objects and the identified sounds from the video and audio portions, respectively, are weighted, and are then added together. Weighting factors for identified physical objects may be stored in the object attributes database 232. Similarly, weighting factors for identified sounds may be stored in the sound attributes database 248.

In some embodiments, the relevance value for the commentary may be normalized to some standard basis or per unit basis. After normalization, all commentaries for a particular subject media content event will have a relevance value that can be meaningfully compared to the relevance values of other commentaries. Any suitable normalization or other statistical analysis process may be used by the various embodiments so that the relevance value for individual commentaries can be meaningfully compared with each other.

Optionally, some embodiments may parse out the community member's commentary from the video portion of the commentary that has been acquired by the 360° video camera 102. This parsed out video portion may be saved into the commentary storage 224 of the memory medium 204. This video information may later be used for the generation of the animated avatar that will be used to present the community member's commentary to a requesting community member.

Once the quality value and/or relevance value of the community member's commentary have been determined, and the optional commentary is parsed out, this information is communicated from the community member commentary generator 116 to the content community platform 118 (FIG. 1). The information is saved into the community member commentary storage device 126 and/or is saved into another suitable local or remote memory medium.

When a community member requests commentary pertaining to a specified media content event of interest (interchangeably referred to herein as the subject media content event), commentary associated with the specified subject media content event may be accessed or retrieved from the commentary storage 232. Embodiments of the community member commentary acquisition system 100 select a plurality of commentaries for presentation to the requesting community member. The plurality of selected commentaries are then communicated to an electronic presentation device, preferably with a display device, for presentation to the requesting community member (the viewer). Selection of the plurality of commentaries from the available commentaries for a particular requesting community member are based on the determined commentary rating that is based on a quality value and/or a determined relevance value.

Candidate commentaries are identified from the available commentaries based, in part, upon the quality value. Commentaries that have a relatively high quality value are selected as candidate commentaries. Commentaries that have a relatively low quality value are not selected as candidate commentaries. Additionally, or alternatively, candidate commentaries are identified from the available commentaries based, in part, upon the relevance value. Commentaries that have a relatively high relevance value are selected as candidate commentaries. Commentaries that have a relatively low relevance value are not selected as candidate commentaries. Candidate commentaries may include all available commentaries that are associated with the subject media content event specified in the commentary request generated by the requesting community member.

The relevance value for a particular commentary is determined when the request from the requesting community member for commentary about a particular subject media content event is received. In an example embodiment, the relevance value previously determined by the community member commentary generator 116 is adjusted by the interpersonal relationships between the community member 104 who generated the commentary and the requesting community member. Accordingly, those commentaries made by community members 104 having a relatively close interpersonal relationship with the requesting community member may be identified as candidate commentaries. Those commentaries made by community members 104 that do not have a close interpersonal relationship with the requesting community member may not be identified as candidate commentaries.

The candidate commentaries preferably have both a quality value and relevance value. The plurality of commentaries sent to the requesting community member are then selected from the identified candidate commentaries. Embodiments may use various processes and methods of selecting particular commentaries from the candidate commentaries.

In an example embodiment, a predefined total number of commentaries are selected from the candidate commentaries for a particular requesting community member. The total number of selected commentaries may be specified by an administrator of the community member commentary generator 116 and/or an administrator of the content community platform 118. Alternatively, the total number of commentaries may be specified by the requesting community member. As a result, a manageable number of commentaries are selected from among many hundreds of, or even thousands of, available commentaries for a specified subject media content event. The selected commentaries are then communicated to the electronic device being used by the requesting community member to consume the commentaries.

A variety of processes and methods may be used to select the predefined total number of commentaries to the requesting community member based on the commentary rating. In an example embodiment, the commentary rating is, or is based on, the determined quality value. A predefined number of those candidate commentaries having the highest quality value are selected. Here, the relevance values are not used to determine the commentary rating.

In another example embodiment, the commentary rating is, or is based on, the determined relevance value. A predefined number of those candidate commentaries having the highest relevance value are selected. Here, the quality values are not used to determine the commentary rating.

In yet another embodiment, the commentary rating is, or is based on, either of the quality values or the relevance values. A first predefined number of those candidate commentaries having the highest quality value are selected. And, a second predefined number of those candidate commentaries having the highest relevance value are selected. For example, the ten (the first predefined number) candidate commentaries having the highest quality value are selected, and the ten (the second predefined number) candidate commentaries having the highest relevance value are selected, such that a total of twenty commentaries (the predefined total number of commentaries) are selected for presentation to the requesting community member. Any suitable numbers for the total, the first and the second predefined numbers of commentaries may be used in the various embodiments. In some embodiments, the total, the first and/or the second predefined numbers are specified by an administrator of the community member commentary generator 116 and/or an administrator of the content community platform 118. Alternatively, the total, the first and/or the second predefined numbers are specified by the requesting community member.

In an alternative embodiment, the quality value and the relevance value for each candidate commentary are summed (added together) to define the commentary rating. The predefined total number of commentaries sent to the requesting community member are then selected from the identified candidate commentaries that have the highest commentary rating (the total of the quality value and the relevance value).

In some embodiments, the quality value and/or the relevance value for each candidate commentary are scaled by a predefined weighting factor. Then, the scaled quality value and the scaled relevance value are summed (added together) to define the commentary rating. As a result of applying the weighting, the determined commentary rating for all generated commentaries for a particular subject media content event can be meaningfully compared with each other. For example, the commentary ratings may be expressed on a relative basis, such as a per unit basis or other suitable normalized basis.

The predefined total number of commentaries sent to the requesting community member are then selected from the identified candidate commentaries that have the highest commentary rating that has been determined from the scaled quality value and the scaled relevance value. In some embodiments, only one of the quality value or the relevance value are scaled by the predefined weighting factor. Any suitable predefined weighting factor(s) may be used in the various embodiments. In some embodiments, the predefined weighting factor(s) are specified by an administrator of the community member commentary generator 116 and/or an administrator of the content community platform 118. Alternatively, the predefined weighting factor(s) are specified by the requesting community member It should be emphasized that the above-described embodiments of the community member commentary acquisition system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for determining a commentary rating for a community member's commentary about a subject media content event, the method comprising:
  receiving video information acquired by a 360° video camera,
    wherein the acquired video information substantially spans a 360° field of view about a community member who is generating commentary about the subject media content event, and wherein an image of the community member generating the commentary and an image of a physical object are shown in the acquired video information;
identifying the physical object that is visible in the received video information;
determining an attribute associated with the identified physical object, wherein the determined attribute is one of a word or a phrase that describes a characteristic of the identified physical object;
determining a range of the physical object from the community member who is generating the commentary, wherein the determined range is defined by a distance;
comparing the determined attribute of the identified physical object with a plurality of predefined physical object attributes stored in a database,
wherein each one of the plurality of predefined physical object attributes describe the characteristic of a particular one of a plurality of physical objects by using a word or a phrase,
wherein each one of the plurality of predefined physical object attributes is associated with a quality value, and
wherein the quality value corresponds to the quality of commentary relative to the subject media content event of interest;
in response to identifying one of the plurality of predefined physical object attributes that matches the determined physical attribute, associating the quality value of the identified one of the plurality of predefined physical object attributes with the identified physical object; and
determining a commentary rating for the commentary by weighting the associated quality value inversely proportional to said distance.

2. The method of claim 1,
wherein determining the attribute associated with the identified physical object comprises:
determining that the attribute of the identified physical object is a person.

3. The method of claim 2, wherein determining the range of the person from the community member who is generating the commentary comprises:
receiving first range and orientation information corresponding to a first range and orientation between the community member who is generating the commentary and the 360° video camera;
receiving second range and orientation information corresponding to a second range and orientation between the person and the 360° video camera;
determining the first range and orientation between the community member who is generating the commentary and the 360° video camera based on the first range and orientation information;
determining the second range and orientation between the person and the 360° video camera based on the second range and orientation information; and
determining the range from the person from the community member who is generating the commentary based on the determined first range and orientation information and the second range and orientation information.

4. The method of claim 1,
wherein determining the attribute associated with the identified physical object comprises:
determining that the attribute of the identified physical object is a person; and
determining a facial expression of the person, wherein the determined facial expression is defined by a facial expression attribute;
wherein comparing the determined attribute of the identified physical object with a plurality of predefined physical object attributes comprises:
comparing the determined facial expression attribute with a plurality of predefined facial expression attributes stored in the database; and
wherein associating the quality value of the identified one of the plurality of predefined physical object attributes with the identified physical object comprises:
associating the quality value of the identified facial expression attribute with the identified person.

5. The method of claim 1,
wherein determining the attribute associated with the identified physical object comprises:
determining that the attribute of the identified physical object is a person; and
determining a gesture being made by the person, wherein the determined gesture is defined by a gesture attribute;
wherein comparing the determined attribute of the identified physical object with a plurality of predefined physical object attributes comprises:
comparing the determined gesture attribute with a plurality of predefined gesture attributes stored in the database; and
wherein associating the quality value of the identified one of the plurality of predefined physical object attributes with the identified physical object comprises:
associating the quality value of the identified gesture attribute with the identified person.

6. The method of claim 1, wherein a plurality of physical objects are visible in the received video information, the method further comprising:
determining that the attribute of the identified plurality of the physical objects is a person;
determining a number of the plurality of people that are within a predefined range threshold of the community member who is generating the commentary and that are within a predefined angle of view in front of the community member who is generating the commentary;
comparing a plurality of predefined numbers of people with the determined number of the identified plurality of people that are within the predefined range threshold of the community member who is generating the commentary and that are within the predefined angle of view in front of the community member who is generating the commentary, wherein each of the predefined numbers of people are associated with a quality value; and
in response to identifying the predefined number that matches the determined number of the identified plurality of people that are within the predefined range threshold of the community member who is generating the commentary and that are within the predefined angle of view in front of the community member who is generating the commentary, associating the quality value of the identified predefined number of people with the commentary; and
determining the commentary rating for the commentary based on the associated quality value that corresponds to the determined number of the plurality of people.

7. The method of claim 1,
wherein determining the attribute associated with the identified physical object comprises:
  determining that the attribute of the identified physical object is a person; and
  determining a name of the person;
wherein comparing the determined physical attribute of the identified physical object with a plurality of predefined physical object attributes comprises:
  comparing the determined name with a plurality of predefined names of people that are known to the community member who is generating the commentary; and
the method further comprising:
  in response to identifying one of the plurality of predefined names that matches the determined name of the person, associating a relevance value of the identified one of the plurality of predefined names with the identified name of the person, wherein the relevance value is associated with a degree of interpersonal relationship between the identified person and the community member who is generating the commentary; and
  determining the commentary rating for the commentary based on the associated relevance value and the quality value.

8. The method of claim 1,
wherein determining the attribute associated with the identified physical object comprises:
  determining that the attribute of the identified physical object is an inanimate physical object, wherein the determined attribute is defined by a word or phrase that describes the inanimate physical object;
wherein comparing the determined attribute of the identified physical object with a plurality of predefined physical object attributes comprises:
  comparing the attribute with a plurality of predefined inanimate physical object attributes stored in the database, wherein each one of the predefined inanimate physical object attributes are defined by a word or a phrase that describes the associated one of a plurality of inanimate physical objects; and
  identifying one of the plurality of predefined inanimate physical object attributes that matches the attribute;
wherein associating the quality value of the identified one of the plurality of predefined physical object attributes with the identified physical object comprises:
  associating the quality value of the identified predefined inanimate physical object attributes with the identified inanimate physical object.

9. The method of claim 1, further comprising:
receiving audio information acquired by the 360° video camera while the community member is generating the commentary;
identifying a sound that is in the received audio information;
determining an attribute associated with the identified sound, wherein the determined attribute is one of a word or a phrase that describes a characteristic of the identified sound;
comparing the determined attribute of the identified sound with a plurality of predefined sound attributes stored in the database,
  wherein each one of the plurality of predefined sound attributes describe the characteristic of a particular one of a plurality of sounds,
  wherein each one of the plurality of predefined sound attributes are associated with a quality value, and
  wherein the quality value corresponds to the quality of commentary relative to the subject media content event of interest;
in response to identifying one of the plurality of predefined sound attributes that matches the determined sound attribute, associating the quality value of the identified one of the plurality of sound attributes with the identified sound; and
determining a commentary rating for the commentary based on the associated quality value.

10. The method of claim 1, further comprising:
receiving audio information acquired by the 360° video camera while the community member is generating the commentary;
identifying a sound that is in the received audio information;
determining a plurality of spoken words from the identified sound;
identifying a name of a person based on the identified spoken words, wherein the name of the person corresponds to the identified physical object in the video information;
comparing the determined name with a plurality of predefined names of people known to the community member who is generating the commentary;
in response to identifying one of the plurality of predefined names that matches the determined name of the person, associating a relevance value of the identified one of the plurality of predefined names with the identified name of the person, wherein the relevance value is associated with a degree of interpersonal relationship between the identified person and the community member who is generating the commentary; and
determining the commentary rating for the commentary based on the associated relevance value and the quality value.

11. The method of claim 1, further comprising:
receiving audio information acquired by the 360° video camera while the community member is generating the commentary;
identifying a sound that is in the received audio information;
determining a plurality of spoken words from the identified sound;
determining that the physical object, who is a person, is verbally disagreeing with or is verbally agreeing with the commentary of the community member based on the identified spoken words;
in response to determining that the person is disagreeing, associating a first quality value with the commentary;
in response to determining that the person is agreeing, associating a second quality value with the commentary, wherein the second quality value is higher than the first quality value; and
determining the commentary rating for the commentary based on the associated first quality value or the second quality value.

12. The method of claim 1, further comprising:
receiving audio information acquired by the 360° video camera while the community member is generating the commentary;
identifying a sound that is in the received audio information;

determining an emotional state of the community member based on the identified sound;

determining that the community member is speaking truthfully or is not speaking truthfully based on the determined emotional state;

in response to determining that the person is not speaking truthfully, associating a first quality value with the commentary;

in response to determining that the person is speaking truthfully, associating a second quality value with the commentary, wherein the second quality value is higher than the first quality value; and determining the commentary rating for the commentary based on the associated first quality value or the second quality value.

13. The method of claim 1, further comprising:

identifying a gesture being made by the community member from the video information acquired by the 360° video camera while the community member is generating the commentary;

determining an emotional state of the community member based on the identified gesture;

determining that the community member is speaking truthfully or is not speaking truthfully based on the determined emotional state;

in response to determining that the person is not speaking truthfully, associating a first quality value with the commentary;

in response to determining that the person is speaking truthfully, associating a second quality value with the commentary, wherein the second quality value is higher than the first quality value; and determining the commentary rating for the commentary based on the associated first quality value or the second quality value.

14. The method of claim 1, further comprising:

identifying a facial expression being made by the community member from the video information acquired by the 360° video camera while the community member is generating the commentary;

determining an emotional state of the community member based on the identified facial expression;

determining that the community member is speaking truthfully or is not speaking truthfully based on the determined emotional state;

in response to determining that the person is not speaking truthfully, associating a first quality value with the commentary;

in response to determining that the person is speaking truthfully, associating a second quality value with the commentary, wherein the second quality value is higher than the first quality value; and determining the commentary rating for the commentary based on the associated first quality value or the second quality value.

15. The method of claim 1, wherein the video information comprises a series of sequentially arranged image frames, and further comprising:

selecting one of the plurality of image frames from the received video information; and analyzing the selected image frame to identify the physical object.

16. The method of claim 15, wherein the image frame is a first image frame, wherein the physical object is a person, and wherein after the physical object has been identified in the selected first image frame, the method further comprising:

picking a second image frame that was acquired by the 360° video camera after the first image frame was acquired;

determining if the person identified in the first image frame is identifiable in the second image frame;

in response to determining that the person is not identifiable in the second image frame, associating a first quality value with the commentary;

in response to determining that the person is also identifiable in the second image frame, associating a second quality value with the commentary, wherein the second quality value is higher than the first quality value; and determining the commentary rating for the commentary based on the associated first quality value or the second quality value.

17. The method of claim 15, wherein the image frame is a first image frame, wherein the identified physical object is a first one of a plurality of people identified in the video information, wherein the other plurality of people are identified in the first image frame, the method further comprising:

picking a second image frame that was acquired by the 360° video camera after the first image frame was acquired;

determining if the plurality of people identified in the first image frame are identifiable in the second image frame;

in response to determining that the plurality of people are not in the second image frame, concluding that the community member is not speaking to an audience comprised of the plurality of people and then associating a first quality value with the commentary;

in response to determining that the plurality of people are also identifiable in the second image frame, concluding that the community member is speaking to an audience comprised of the plurality of people and then associating a second quality value with the commentary, wherein the second quality value is higher than the first quality value; and determining the commentary rating for the commentary based on the associated first quality value or the second quality value.

18. The method of claim 1, further comprising:

weighting the quality value, wherein the commentary rating determined for the commentary of the community member is defined on a relative basis as other commentary ratings generated by other community members.

19. The method of claim 18, wherein a plurality of commentaries are stored, and wherein each of the stored plurality of commentaries pertains to one of a plurality of different subject media content events, the method further comprising:

receiving a request from a device being operated by a community member, wherein the request specifies the subject media content event, and wherein the community member is requesting commentaries for the subject media content event;

identifying a first plurality of commentaries from the stored plurality of commentaries, wherein the first plurality of commentaries are associated with the specified subject media content event; and selecting a second plurality of commentaries from the first plurality of commentaries, wherein a predefined number of commentaries are selected for the second plurality of commentaries, and wherein the selected second plurality of commentaries have the highest commentary ratings from among the first plurality of commentaries.

20. The method of claim 18, wherein a plurality of commentaries are stored, and wherein each of the stored plurality of commentaries pertains to one of a plurality of different subject media content events, the method further comprising:

receiving a request from a device being operated by a community member, wherein the request specifies the subject media content event, and wherein the community member is requesting commentaries for the subject media content event;

in response to receiving the request, determining whether one of the physical objects identified in the video information acquired by the 360° video camera is a person that is known to the requesting community member;

in response to identifying the person that is known to the requesting community member, associating a relevance value associated with the person that is known to the requesting community member, wherein the relevance value is associated with a degree of interpersonal relationship between the person that is known to the requesting community member and the requesting community member;

adjusting the commentary rating for the commentary based on the associated relevance value and the quality value;

identifying a first plurality of commentaries from the stored plurality of commentaries, wherein the first plurality of commentaries are associated with the specified subject media content event; and selecting a second plurality of commentaries from the first plurality of commentaries, wherein a predefined number of commentaries are selected for the second plurality of commentaries, and wherein the selected second plurality of commentaries have the highest commentary ratings from among the first plurality of commentaries.

* * * * *